(12) United States Patent
Koopman

(10) Patent No.: US 8,572,496 B2
(45) Date of Patent: Oct. 29, 2013

(54) EMBEDDING VARIABLE FIELDS IN INDIVIDUAL EMAIL MESSAGES SENT VIA A WEB-BASED GRAPHICAL USER INTERFACE

(75) Inventor: David Koopman, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 363 days.

(21) Appl. No.: 12/823,615

(22) Filed: Jun. 25, 2010

(65) Prior Publication Data

US 2011/0265016 A1     Oct. 27, 2011

Related U.S. Application Data

(63) Continuation-in-part of application No. 12/796,597, filed on Jun. 8, 2010, which is a continuation-in-part of application No. 12/768,681, filed on Apr. 27, 2010, and a continuation-in-part of application No. 12/768,688, filed on Apr. 27, 2010, and a continuation-in-part of application No. 12/768,675, filed on Apr. 27, 2010.

(51) Int. Cl.
*G06F 3/00*     (2006.01)
*G06F 3/01*     (2006.01)

(52) U.S. Cl.
USPC ........... 715/752; 709/206; 709/207; 715/225; 715/234; 715/760

(58) Field of Classification Search
USPC ........... 715/752, 225, 234, 760; 709/206–207
See application file for complete search history.

(56) References Cited

U.S. PATENT DOCUMENTS

| | | | | |
|---|---|---|---|---|
| 5,228,123 A * | 7/1993 | Heckel | ......................... | 715/762 |
| 5,404,294 A * | 4/1995 | Karnik | ......................... | 715/236 |
| 5,414,841 A * | 5/1995 | Bingham et al. | ...................... | 1/1 |
| 6,192,396 B1 * | 2/2001 | Kohler | ......................... | 709/206 |
| 6,205,358 B1 * | 3/2001 | Haeg et al. | ......................... | 607/36 |
| 6,658,622 B1 * | 12/2003 | Aiken et al. | ................... | 715/210 |
| 6,755,694 B2 * | 6/2004 | Ries et al. | ..................... | 439/668 |
| 6,772,139 B1 * | 8/2004 | Smith, III | ..................... | 707/748 |
| 6,792,312 B2 * | 9/2004 | Bruchmann et al. | ............ | 607/37 |
| 7,051,273 B1 * | 5/2006 | Holt et al. | ..................... | 715/226 |
| 7,062,536 B2 * | 6/2006 | Fellenstein et al. | ........... | 709/206 |
| 7,103,853 B1 * | 9/2006 | Patil | ............................. | 715/824 |
| 7,130,887 B2 * | 10/2006 | Goldberg | ...................... | 709/206 |
| 7,246,305 B2 * | 7/2007 | Batres | ........................... | 715/234 |

(Continued)

OTHER PUBLICATIONS http://office.microsoft.com/en-us/word-help/field-codes-mergefield-field-HP005186172.aspx, printed Aug. 2012 but refers to Word 2003, one page.*

(Continued)

*Primary Examiner* — Steven B Theriault
(74) *Attorney, Agent, or Firm* — Sergey G. Zaytsev; Chris A. Watt

(57) ABSTRACT

Method and system of present invention provide a web-based graphical user interface to a remote user for sending electronic messages, where the interface comprises an element for selecting an option for sending individual electronic messages to multiple recipients in visible fields ("to" and "cc"), obtain a set of data, comprising a list of two or more recipients in visible fields, a message subject and/or a message body, where the message subject and/or the message body contain a markup indicating variable field, and generate and transmit individual electronic messages.

52 Claims, 20 Drawing Sheets

(56) References Cited

U.S. PATENT DOCUMENTS

| | | | |
|---|---|---|---|
| 7,290,219 B2* | 10/2007 | Boyles et al. | 715/810 |
| 7,333,233 B2* | 2/2008 | Gauthier | 358/1.18 |
| 7,392,293 B2* | 6/2008 | Leonik | 709/217 |
| 7,403,953 B2* | 7/2008 | Lockhart | 1/1 |
| 7,457,842 B2* | 11/2008 | Heilmann | 709/206 |
| 7,532,355 B2* | 5/2009 | Gauthier et al. | 358/1.18 |
| 7,548,952 B2 | 6/2009 | Delia et al. | |
| 7,584,417 B2* | 9/2009 | Friend et al. | 715/224 |
| 7,636,883 B2* | 12/2009 | Albornoz et al. | 715/231 |
| 7,680,891 B1* | 3/2010 | Pongsajapan | 709/206 |
| 7,711,779 B2* | 5/2010 | Goodman et al. | 709/206 |
| 7,716,602 B2* | 5/2010 | Etgen | 715/833 |
| 7,743,105 B2* | 6/2010 | Bauchot et al. | 709/206 |
| 7,743,334 B2* | 6/2010 | Rider | 715/762 |
| 7,890,593 B2* | 2/2011 | Chen et al. | 709/206 |
| 7,941,491 B2* | 5/2011 | Sood | 709/206 |
| 7,945,954 B2* | 5/2011 | Coueignoux | 726/22 |
| 7,979,793 B2* | 7/2011 | Miller et al. | 715/255 |
| 8,010,599 B2* | 8/2011 | Chang et al. | 709/203 |
| 8,099,465 B2* | 1/2012 | Daniels et al. | 709/206 |
| 8,108,763 B2* | 1/2012 | Gao et al. | 715/209 |
| 8,117,339 B2* | 2/2012 | Adelman et al. | 709/245 |
| 8,185,741 B1* | 5/2012 | Agrawal et al. | 713/176 |
| 2002/0019827 A1* | 2/2002 | Shiman et al. | 707/200 |
| 2002/0107930 A1* | 8/2002 | Itoh | 709/206 |
| 2002/0174417 A1* | 11/2002 | Sijacic et al. | 717/147 |
| 2003/0009529 A1* | 1/2003 | Powers | 709/206 |
| 2003/0110443 A1* | 6/2003 | Yankovich et al. | 715/501.1 |
| 2003/0154085 A1* | 8/2003 | Kelley | 704/275 |
| 2004/0199597 A1* | 10/2004 | Libbey et al. | 709/207 |
| 2004/0205185 A1* | 10/2004 | Leonik | 709/224 |
| 2004/0215606 A1* | 10/2004 | Cossock | 707/3 |
| 2005/0039017 A1* | 2/2005 | Delany | 713/176 |
| 2005/0039019 A1* | 2/2005 | Delany | 713/176 |
| 2005/0039119 A1* | 2/2005 | Parks et al. | 715/515 |
| 2005/0060643 A1* | 3/2005 | Glass et al. | 715/501.1 |
| 2005/0102348 A1* | 5/2005 | Parsons et al. | 709/201 |
| 2005/0185212 A1* | 8/2005 | Gauthier | 358/1.15 |
| 2005/0223326 A1* | 10/2005 | Chang et al. | 715/533 |
| 2006/0031315 A1* | 2/2006 | Fenton et al. | 709/206 |
| 2006/0129635 A1* | 6/2006 | Baccou et al. | 709/203 |
| 2006/0168032 A1* | 7/2006 | Cai et al. | 709/206 |
| 2006/0200530 A1* | 9/2006 | Tokuda et al. | 709/206 |
| 2006/0212810 A1* | 9/2006 | Segal et al. | 715/530 |
| 2006/0236254 A1* | 10/2006 | Mateescu et al. | 715/762 |
| 2006/0242109 A1 | 10/2006 | Pereira et al. | |
| 2007/0112927 A1* | 5/2007 | Jung | 709/206 |
| 2007/0124399 A1* | 5/2007 | Gillespie et al. | 709/206 |
| 2007/0127784 A1* | 6/2007 | Taylor | 382/115 |
| 2007/0198672 A1* | 8/2007 | Pak et al. | 709/206 |
| 2008/0022013 A1* | 1/2008 | Adelman et al. | 709/245 |
| 2008/0022271 A1* | 1/2008 | D'Angelo et al. | 717/168 |
| 2008/0059874 A1* | 3/2008 | Spencer | 715/235 |
| 2008/0086369 A1* | 4/2008 | Kiat et al. | 705/14 |
| 2008/0086530 A1* | 4/2008 | Gandhi et al. | 709/206 |
| 2008/0098312 A1* | 4/2008 | Chang et al. | 715/752 |
| 2008/0177843 A1* | 7/2008 | Gillum et al. | 709/206 |
| 2008/0186534 A1* | 8/2008 | Sytema | 358/1.15 |
| 2008/0209208 A1* | 8/2008 | Parkinson | 713/156 |
| 2008/0215686 A1* | 9/2008 | Meredith et al. | 709/206 |
| 2008/0222254 A1 | 9/2008 | Mukherjee | |
| 2008/0275873 A1* | 11/2008 | Bosarge et al. | 707/5 |
| 2008/0278740 A1* | 11/2008 | Bird et al. | 358/1.15 |
| 2008/0288300 A1* | 11/2008 | Emling et al. | 705/4 |
| 2008/0294479 A1* | 11/2008 | Emling et al. | 705/7 |
| 2009/0037546 A1* | 2/2009 | Kirsch | 709/206 |
| 2009/0089377 A1* | 4/2009 | Rubinger | 709/206 |
| 2009/0113293 A1* | 4/2009 | Schubert | 715/256 |
| 2009/0172109 A1* | 7/2009 | Weir et al. | 709/206 |
| 2009/0187629 A1* | 7/2009 | Chakra et al. | 709/206 |
| 2009/0214034 A1* | 8/2009 | Mehrotra et al. | 380/255 |
| 2009/0217028 A1* | 8/2009 | Khan et al. | 713/150 |
| 2009/0307323 A1* | 12/2009 | Kato et al. | 709/206 |
| 2009/0313209 A1* | 12/2009 | Lu et al. | 707/2 |
| 2010/0057861 A1* | 3/2010 | Nigam et al. | 709/206 |
| 2010/0100599 A1 | 4/2010 | Witzany | |
| 2010/0121879 A1* | 5/2010 | Greenberg | 707/779 |
| 2010/0146059 A1* | 6/2010 | DellaFera et al. | 709/206 |
| 2010/0198927 A1* | 8/2010 | Tonnison et al. | 709/206 |
| 2010/0251092 A1* | 9/2010 | Sun | 715/222 |
| 2010/0262662 A1* | 10/2010 | Wang | 709/206 |
| 2010/0269033 A1* | 10/2010 | Siegel | 715/234 |
| 2010/0299399 A1* | 11/2010 | Wanser et al. | 709/206 |
| 2010/0313119 A1* | 12/2010 | Baldwin et al. | 715/256 |
| 2011/0083079 A1* | 4/2011 | Farrell et al. | 715/739 |
| 2011/0093769 A1* | 4/2011 | Dunn et al. | 715/221 |
| 2011/0145342 A1* | 6/2011 | Berger et al. | 709/206 |
| 2011/0173272 A1 | 7/2011 | Carvalho et al. | |
| 2011/0179362 A1* | 7/2011 | Craddock et al. | 715/752 |
| 2011/0225245 A1* | 9/2011 | Bhogal et al. | 709/206 |
| 2011/0314391 A1* | 12/2011 | Chang et al. | 715/752 |

OTHER PUBLICATIONS http://office.microsoft.com/en-us/word-help/add-fields-to-a-form-letter-or-other-mail-merge-document-HP005187661.aspx?CTT=3, printed Aug. 2012 but applies to Word 2003, pp. 1-2.*
http://login.salesforce.com/help/doc/en/valid_merge_fields.htm, 2000 pp. 1-3.*
http://www.edtechninja.com/2009/01/mail-merge/, Jan. 2009, pp. 1-9.*
Carbera et al. "Special Edition Using Microsoft Word 2002", Jun. 2001.*
MailChimp.com et. al. "How to use Merge Tags"; Feb. 21, 2010 retrieved from Web.archive.org.*
Microsoft et. al. "Use Mail merge to send personalized e-mail messages to your email address list" Jun. 18, 2010.*
Sahami, A Bayesian Approach to Filtering Junk E-mail, Jul. 1998.
Tschabitscher, Sending an Email to Multiple Recipients, Webpage from about.com, Apr. 2010.
Tschabitscher, How to Send an Email to Undisclosed Recipients. Webpage from about.com, Apr. 2010.
Send separate cmd email to multiple individual recipients. Webpage from febooti.com, Apr. 23, 2007.
[Mailman-Users] webmail issues. Webpage from python.org, Feb. 25, 2002.
WebMail Assistant for Hotmail and Yahoo. Webpage from soft14. com, Apr. 2010.
Send Personally. Webpage from Trialr.com, Apr. 2010.
SuperMailer. Webpage from Trialr.com, Apr. 2010.
May 22, 2012 response to Mar. 2, 2012 Office Action in related U.S. Appl. No. 12/768,688.
Jun. 27, 2012 office action in related U.S. Appl. No. 12/768,675.
Jul. 3, 2012 office action in related U.S. Appl. No. 12/768,681.
Jul. 5, 2012 office action in related U.S. Appl. No. 12/768,688.
Jun. 21, 2012 office action in related U.S. Appl. No. 12/796,597.
Oct. 14, 2012 office action in related U.S. Appl. No. 12/796,597.
Boyce, "Microsoft Office Outlook 2003 Inside Out", Nov. 12, 2003, Microsoft Press, p. 706-712.
Sep. 7, 2012 response to Jun. 27, 2012 office action in related U.S. Appl. No. 12/768,675.
Sep. 7, 2012 response to Jul. 3, 2012 office action in related U.S. Appl. No. 12/768,681.
Sep. 7, 2012 response to Jul. 5, 2012 office action in related U.S. Appl. No. 12/768,688.
Sep. 7, 2012 response to Jun. 21, 2012 office action in related U.S. Appl. No. 12/796,597.
Sep. 24, 2012 office action in related U.S. Appl. No. 12/768,675.
Sep. 24, 2012 office action in related U.S. Appl. No. 12/768,681.
Outlook Mail Merge Sender—Send Personalized Emails to Distribution List, published Oct. 31, 2009 http://web.archive.org/web/20091031131926/http://www.accmsoft.com/office-outlook|mail-merge-sender/.
Sep. 27, 2012 office action in related U.S. Appl. No. 12/768,688.

* cited by examiner

EMBEDDING VARIABLE FIELDS IN INDIVIDUAL EMAIL MESSAGES SENT VIA A WEB-BASED GRAPHICAL USER INTERFACE

CROSS REFERENCE TO RELATED PATENT APPLICATIONS

This patent application is a continuation-in-part of U.S. patent application Ser. No. 12/796,597, "Method and System for a User Sending Individual Email Messages via a Web-Based Graphical User Interface," filed Jun. 8, 2010.

U.S. patent application Ser. No. 12/796,597 is a continuation-in-part of the following patent applications:

U.S. patent application Ser. No. 12/768,675, "Method and System for Sending Individual Email Messages," filed Apr. 27, 2010.

U.S. patent application Ser. No. 12/768,681, "Method and System for Declining Outgoing Email Messages," filed Apr. 27, 2010.

U.S. patent application Ser. No. 12/768,688, "Tools for Sending Individual Email Messages," filed Apr. 27, 2010.

The subject matter of all patent applications is commonly owned and assigned to Go Daddy Operating Company, LLC. All prior and concurrent applications are incorporated herein in their entirety by reference.

FIELD OF THE INVENTION

The present invention relates in general to electronic mail systems and methods and in particular to systems and methods for sending individual email messages via web-based email interface.

BACKGROUND OF THE INVENTION

Users of computer networks, such as corporate networks or the Internet, routinely send electronic messages to each other. Electronic messages may contain, for example, text, images, links, and attachments. Electronic mail or email is one of the most widely used methods of communication over the Internet due to the variety of data that may be transmitted, the large number of available recipients, speed, low cost and convenience.

Email messages may be sent, for example, between friends, family members or between coworkers thereby substituting for traditional letters and office correspondences in many cases. This is made possible because the Internet has very few restrictions on who may send emails, the number of emails that may be transmitted and who may receive the emails. The only real hurdle for sending emails is the requirement that the sender must know the email address (also called network mailbox) of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Internet users find emails to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and a network connection have been obtained, there are typically few additional costs associated with sending emails. This remains true even if millions, or more, of emails are sent by the same user. Emails thus have the extraordinary power of allowing a single user to send one or more messages to a very large number of people at an extremely low cost.

The Internet has become a very valuable tool for business and personal communications, information sharing, commerce, etc. However, some individuals have abused the Internet. Among such abuses are spam and phishing. Spam, or unsolicited email, is the flooding of the Internet with many copies of the identical or nearly identical message, in an attempt to force the message on people who would not otherwise choose to receive it. Most spam is commercial advertising, often for dubious products, get-rich-quick schemes, or financial or quasi-legal services.

A single spam message received by a user uses only a small amount of the user's email account's allotted disk space, requires relatively little time to delete and does little to obscure the messages desired by the user. Even a small number of spam messages, while still annoying, would nonetheless cause relatively few real problems. However, the amount of spam transmitted over the Internet is growing at an alarming rate. While a single or small number of spam messages are annoying, a large number of spam can fill a user's email account's allotted disk space thereby preventing the receipt of desired email. Also, a large number of spam can take a significant amount of time to delete and can even obscure the presence of desired emails in the user's email account.

Spam messages currently comprise such a large portion of Internet communications that they actually cause data transmission problems for the Internet as a whole. Spam creates data log jams thereby slowing the delivery of more desired data through the Internet. The larger volume of data created by spam also requires Internet providers to buy larger and more powerful (i.e. more expensive) equipment to handle the additional data flow caused by the spam.

Spam has a very poor response rate compared to other forms of advertisement. However, since almost all of the costs/problems for transmitting and receiving spam are absorbed by the recipient of the spam and the providers of the Internet infrastructure, spam nevertheless continues to be commercially viable for a spammer.

Phishing is the luring of sensitive information, such as passwords, credit card numbers, bank accounts and other personal information, from an Internet user by masquerading as someone trustworthy with a legitimate need for such information. Often phishing goes hand-in-hand with spam. The perpetrators send out a large number of email messages to lure as many people as they can to their phishing "nets". Typically, if a user clicks on the link in the email, it takes the user to a webpage that appears very similar to a business that the user might trust. However, this webpage is controlled by the perpetrators and any information entered on the webpage will be forwarded to the perpetrators. The perpetrators may use users' information to commit fraud or other crimes. Often users' information is used for identity theft crimes.

If the user is able to see the URL address of the phishing webpage, the user may realize that it does not belong to a business that the user trusts. Phishers use various techniques to disguise their URL addresses. Among such techniques is hiding the true URL address in the phishing email behind some text, an address of a reputable business, or an image; removing the address bar in the Internet browser; replacing the address bar of the Internet browser with a fake address bar; using IP (Internet Protocol) numbers instead of a domain name in the URL; using domain names that are similar in spelling to the domain names of the reputable businesses; using extremely long URL addresses that the beginning of the address would not be plainly visible in the address bar of the Internet browser; etc. Also, long URL addresses may be harder to analyze, thus further helping the perpetrators in obscuring the true location of their phishing webpages.

There are various techniques used for combating spam and phishing. Among them are spam filtering, email challenge-response systems, maintaining white and/or black lists for email addresses, domain names, and IP numbers, Internet browser add-ons that show the true location of the pages viewed by the user, etc.

For many email filtering systems to work properly, the sender's email address or at least its domain name part should be correct. Often malicious users forge (spoof) the sender's email address when they send out spam, viruses, or phishing email messages.

Even though multiple systems are being used, the amount of spam, phishing, and other Internet abuses is steadily rising. The existing systems identify the trust level of the email senders or analyze the content of the email message. However, an email sender may forge its true identity, use a temporary email account, use an open relay IP to send email messages, or use somebody else's computer to send messages if virus or spy software was installed. Also senders of spam and phishing attacks may provide email message content that is not related to the content of the links embedded in the email or they may use content that looks absolutely legitimate. All of these make it very hard to keep track of email addresses and originating IP addresses, as well as filtering messages based on their content.

Email is commonly used to send messages to multiple recipients. A sender can place email addresses in "to" and "cc" (carbon copy) fields of the email message. All "to" and "cc" recipients will receive the message and will see the other "to" and "cc" recipients. If a sender places email addresses in the "bcc" (blind carbon copy) field, the "to" and "cc" recipients would not know that email message was also blindly copied to "bcc" recipients. Thus, the conventional email systems do not allow for sending messages to multiple recipients where each delivered message appears like it was sent specifically or personally to a particular recipient. The indicator that the email message was sent personally to a particular recipient is when the recipient's email address is appearing in the "to" and "cc" fields.

Therefore, new systems and methods are needed to overcome the limitations of the current systems and methods.

DETAILED DESCRIPTION AND PREFERRED EMBODIMENT

Figure 1:
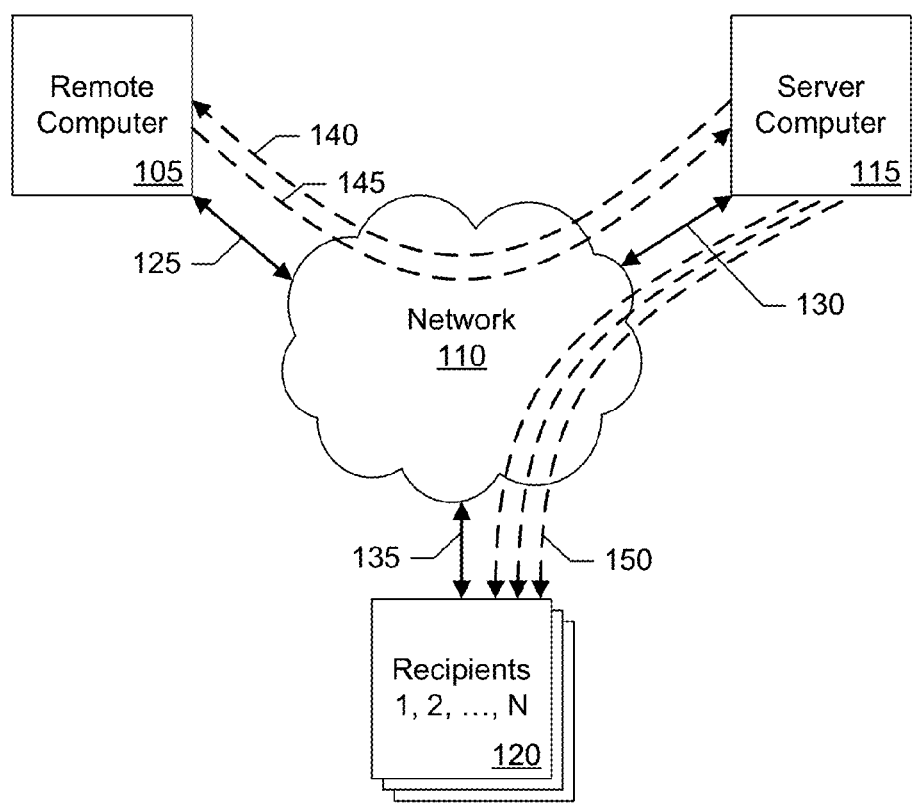
FIG. 1 is a block diagram illustrating an embodiment of a system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purpose of this disclosure the term "visible fields" refers to field "to" (recipient) and/or field "cc" (carbon copy) in the electronic message headers or on a graphical user interface. The term "visible fields" does not refer to field "bcc" (blind carbon copy) in the electronic message headers or on the graphical user interface.

Referring to FIG. 1, an exemplary embodiment of the system of the present invention may include a Remote Computer 105 connectively coupled to a Network 110 via a first Communication Link 125, a Server Computer 115 connectively coupled to the Network 110 via a second Communication Link 130, and two or more Recipients 120 connectively coupled to the Network 110 via a third Communication Link

135. The Remote Computer 105 is typically operated by a remote user (or an end-user), who sends electronic messages to the Recipients 120. Term "remote" indicates that typically the Remote Computer 105 is located physically away from the Server Computer 115. The Remote Computer 105 may include, for example, a personal computer, a desktop computer, a laptop computer, a notebook computer, a tablet computer, a cell phone, a smart phone, a PDA (Personal Digital Assistant), a palmtop computer, a handheld computer, a pocket computer, a touch screen device, an IBM PC-compatible electronic device, an APPLE MAC-compatible electronic device, a computing device, a digital device, or another electronic device or combination thereof.

The Network 110 is a computer network. It may include a LAN (Local Area Network), WLAN (Wireless Local Area Network), WAN (Wide Area Network), MAN (Metropolitan Area Network), a global network, etc. The Internet is a widely-used global computer network. The Network 110 may support a variety of a network layer protocols, such as, DHCP (Dynamic Host Configuration Protocol), DVMRP (Distance Vector Multicast Routing Protocol), ICMP/ICMPv6 (Internet Control Message Protocol), IGMP (Internet Group Management Protocol), IP (Internet Protocol version 4), IPv6 (Internet Protocol version 6), MARS (Multicast Address Resolution Server), PIM and PIM-SM (Protocol Independent Multicast-Sparse Mode), RIP2 (Routing Information Protocol), RIPng for IPv6 (Routing Information Protocol for IPv6), RSVP (Resource ReSerVation setup Protocol), VRRP (Virtual Router Redundancy Protocol), etc. Further, the Network 110 may support a variety of a transport layer protocols, such as, ISTP (Internet Signaling Transport Protocol), Mobile IP (Mobile IP Protocol), RUDP (Reliable UDP), TALI (Transport Adapter Layer Interface), TCP (Transmission Control Protocol), UDP (User Datagram Protocol), Van Jacobson (compressed TCP), XOT (X.25 over TCP), etc. In addition, the Network 110 may support a variety of an application layer protocols, such as, COPS (Common Open Policy Service), FANP (Flow Attribute Notification Protocol), Finger (User Information Protocol), FTP (File Transfer Protocol), HTTP (Hypertext Transfer Protocol), IMAP and IMAP4 (Internet Message Access Protocol, rev 4), IMPPpre (Instant Messaging Presence Protocol), IMPPmes (Instant Messaging Protocol), IPDC (IP Device Control), IRC (Internet Relay Chat Protocol), ISAKMP (Internet Message Access Protocol version 4rev1), ISP, NTP (Network Time Protocol), POP and POP3 (Post Office Protocol, version 3), Radius (Remote Authentication Dial In User Service), RLOGIN (Remote Login), RTSP (Real-time Streaming Protocol), SCTP (Stream Control Transmission Protocol), S-HTTP or HTTPS (Secure Hypertext Transfer Protocol), SLP (Service Location Protocol), SMTP (Simple Mail Transfer Protocol), SNMP (Simple Network Management Protocol), SOCKS (Socket Secure Server), TACACS+ (Terminal Access Controller Access Control System), TELNET (TCP/IP Terminal Emulation Protocol), TFTP (Trivial File Transfer Protocol), WCCP (Web Cache Coordination Protocol), X-Window (X Window), etc. The Network 110 supports digital interactions between the Remote Computer 105, the Server Computer 115, and the Recipients 120.

The Server Computer 115 is one or more computing devices utilized for providing a web-based graphical user interface for sending electronic messages to the remote user operating the Remote Computer 105 (140), obtaining from the Remote Computer 105 an electronic message information (145), and generating and transmitting individual electronic messages to the Recipients 120 (150). The web-based graphical user interface is typically a website or a webpage comprising an element for selecting an option for sending individual electronic messages to multiple recipients in visible fields. The web-based graphical user interface is achieved by a first computer-readable code on the Server Computer 115 and by a second computer-readable code on the Remote Computer 105. The first computer-readable code may comprise, for example, SGML (Standard Generalized Markup Language), HTML (HyperText Markup Language), DHTML (Dynamic HTML), XML (eXtensible Markup Language), XHTML (eXtensible HTML), CSS (Cascading Style Sheet), client-side programming scripts, such as, JavaScript and VBScript, client-side databases, etc. The second computer-readable code may comprise, for example, SGML, HTML, DHTML, XML, XHTML, CSS, server-side programming languages and scripts, such as, Perl, PHP, ASP, ASP.NET, Java, JavaScript, Visual J++, J#, C, C++, C#, Visual Basic, VB.Net, VBScript, server-side databases, etc. Both the first computer-readable code and the second computer-readable code can support embedded objects, such as, audio and video elements, ActiveX controls, etc.

The Server Computer 115 can be running a variety of operating systems, such as, MICROSOFT WINDOWS, APPLE MAC OS X, UNIX, LINUX, GNU, BSD, FreeBSD, SUN SOLARIS, NOVELL NETWARE, OS/2, TPF, eCS (eComStation), VMS, Digital VMS, OpenVMS, AIX, z/OS, HP-UX, OS-400, etc. The web-based graphical user interface may be provided by a web-server software running on the Server Computer 115. The web-server software may include MICROSOFT IIS (Internet Information Services/Server), APACHE HTTP SERVER, APACHE TOMCAT, nginx, GWS (GOOGLE WEB SERVER), SUN JAVA SYSTEM WEB SERVER, etc.

The electronic message information is obtained from the Remote Computer 105 via the web-based graphical user interface. The electronic message information comprises a list of two or more recipients in visible fields, a message body, and an indicator that the option for sending individual electronic messages to multiple recipients in visible fields was selected. The list of two or more recipients is a list of two or more email addresses provided in the "to" and/or "cc" fields; it may also contain recipients' names. The electronic message information may also contain a message subject and other fields. The electronic message information in itself is not an email message, but it can be used to form electronic messages in accepted email standards.

The Server Computer 115 can contain one or more physical servers. The physical servers can play different roles in the system of the invention, e.g., a Web Server, a Mail Server, an Application Server, a Database Server, a DNS (Domain Name System) Server, etc. The Server Computer 115 can be based on a variety of hardware platforms, such as, x86, x64, INTEL, ITANIUM, IA64, AMD, SUN SPARC, IBM, HP, etc.

The Recipients 120 is two or more electronic devices suitable for receiving electronic messages. The Recipients 120 may contain, for example, a personal computer, a desktop computer, a laptop computer, a notebook computer, a tablet computer, a cell phone, a smart phone, a PDA, a palmtop computer, a handheld computer, a pocket computer, a touch screen device, an IBM PC-compatible electronic device, an APPLE MAC-compatible electronic device, a computing device, a digital device, or another electronic device or combination thereof.

The Remote Computer 105, the Server Computer 115, and the Recipients 120 are communicatively connected to the Network 110 via the Communication Links 125, 130, and 135. The Communication Links 125, 130, and 135 are wired or wireless connections suitable for exchange of digital information. The Communication Links 125, 130, and 135 may include telephone line, copper twisted pair, power-line, fiber-optic, cellular, satellite, dial-up, Ethernet, DSL, ISDN, T-1, DS-1, Wi-Fi, etc.

The Server Computer 115 may be located in a physical datacenter, in a virtual datacenter, in a variety of countries or territories, on a floating device, be connected to the Internet backbone, be connected to a power grid, etc. The floating device may be a marine or naval vessel or ship. The Server Computer 115 may be cooled by air or liquid, such as water, including ocean or sea water. The geographical placement of the Server Computer 115 may be chosen to alleviate some legal requirements, limitations and restrictions with having the Server Computer 115 located within a jurisdiction of a particular country or territory. Thus, the Server Computer 115 may be located within a jurisdiction of a chosen country or territory, or outside of a jurisdiction of any country or territory. The choice of a country or territory may be made by the entity implementing the invention.

Figure 2:
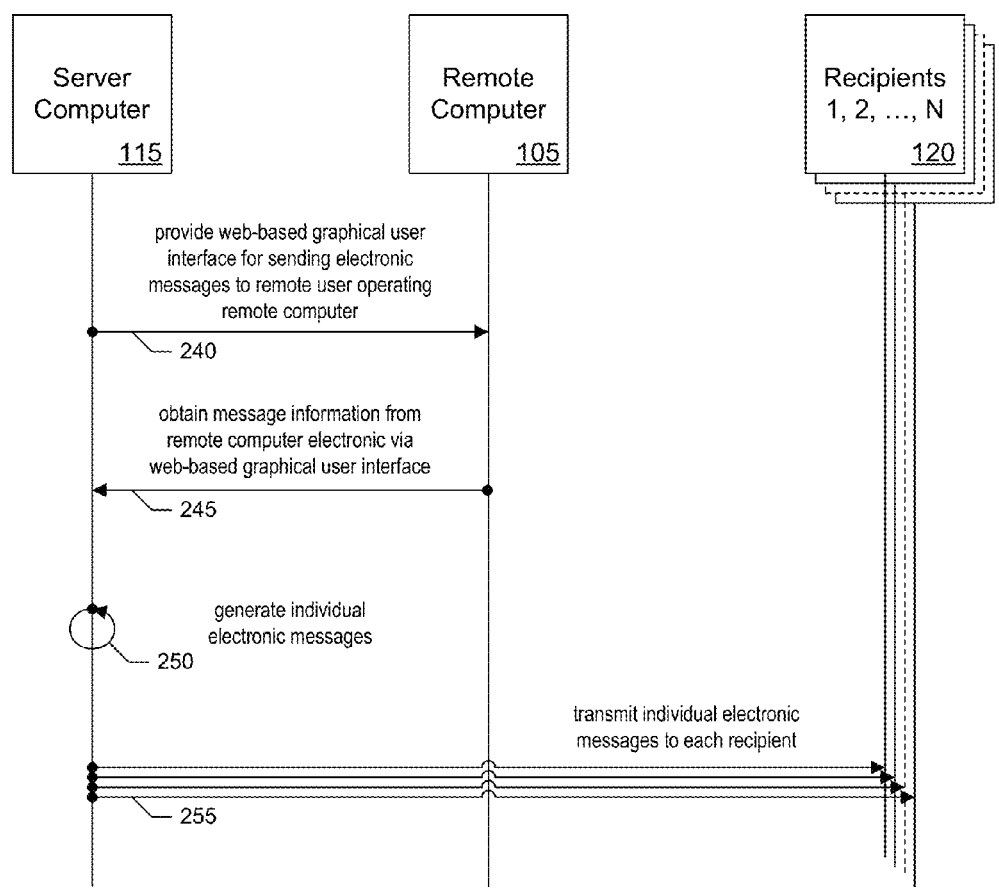
FIG. 2 is an interaction diagram illustrating interactions between the elements of a system of the present invention.

An exemplary embodiment of interactions between the system components is shown in FIG. 2. The Server Computer 115 provides a web-based graphical user interface for sending electronic messages to a remote user operating the Remote Computer 105 (step 240). The web-based graphical user interface comprises at least an element for selecting an option for sending individual electronic messages to multiple recipients in visible fields. The web-based graphical user interface is achieved by a computer-readable code on the Server Computer 115 and the Remote Computer 105.

The Server Computer 115 obtains an electronic message information from the Remote Computer 105 via the web-based graphical user interface (step 245). The electronic message information comprises at least a list of two or more recipients in visible fields, a message body, and an indicator that the option for sending individual electronic messages to multiple recipients in visible fields was selected. The list of two or more recipients is a list of two or more email addresses provided in the "to" and/or "cc" fields; it may also contain recipients' names. The electronic message information may also contain a message subject and other fields. The Server Computer 115 and the Remote Computer 105 are communicatively connected to each other via the Network 110.

The Server Computer 115 generates individual electronic messages to each recipient in the list of two or more recipients in visible fields using the message body (step 250). Then, the Server Computer 115 transmits individual electronic messages to the Recipients 120 (step 255).

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the Server Computer 115 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The list of two or more recipients in visible fields may be obtained from the "to" and/or the "cc" fields of the web-based graphical user interface.

If the remote user chooses the option for sending individual electronic messages to multiple recipients in visible fields, the "cc" or/and "bcc" fields on the web-based graphical user interface may be disabled or hidden. Optionally, if the "cc" field and/or the "bcc" field already contain email addresses of recipients, those email addresses may be moved into the "to" field. Alternatively, if the remote user populates the "bcc" field, the Server Computer 115 may transmit a copy of the individual electronic messages to recipients in the "bcc" field of the web-based graphical user interface.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the Server Computer 115. Tagging of the variable fields may be implemented in a variety of ways. For example, different characters or combination of characters can be used.

Figure 14:
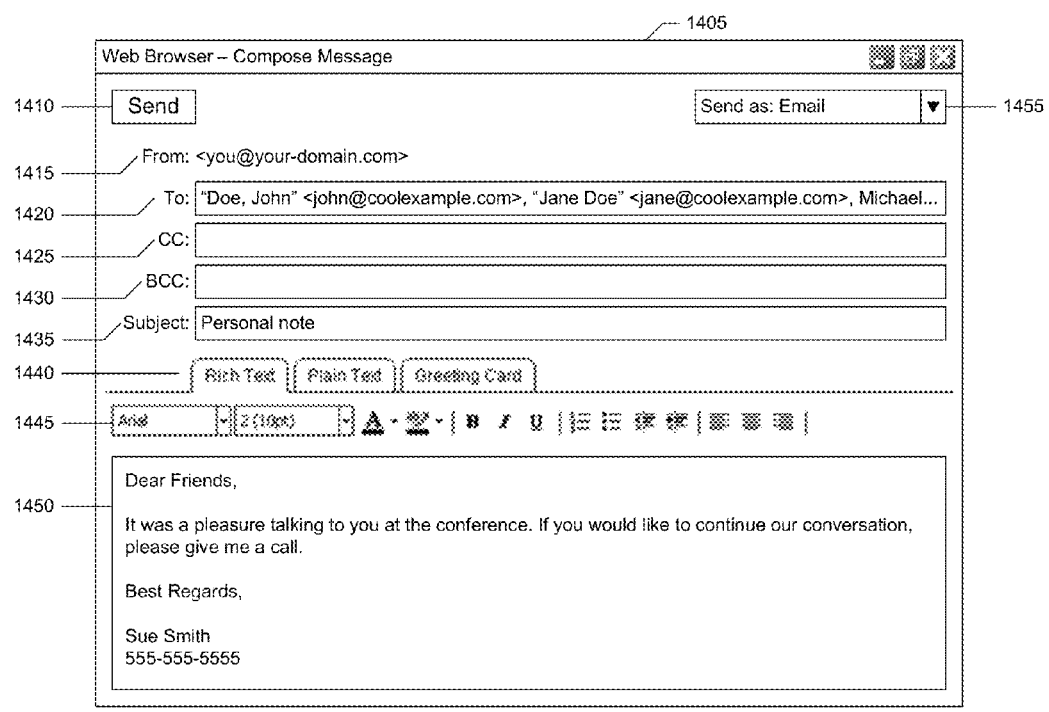
FIGS. 14 and 15 are mockup drawings of a web browser displaying a sample web-based graphical user interface in accordance with the teachings of the present invention.
Figure 15:
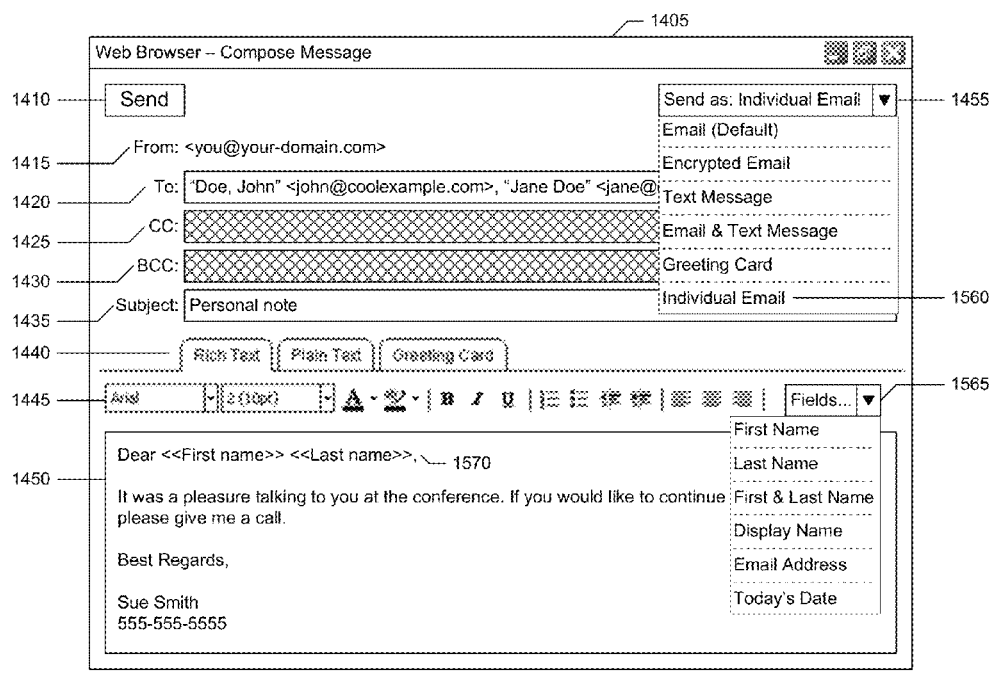

A sample of the web-based graphical user interface is shown in FIGS. 14 and 15. The web-based graphical user interface may be viewed by the remote user via a web browser window 1405. The remote user may compose a message (form the electronic message information) using fields "From" 1415, "To" 1420, "CC" 1425, "BCC" 1430, "Subject" 1435, and "Body" 1450. The remote user may choose a message format 1440 (e.g., rich/formatted text, plain text, greeting card, etc.). Depending on the chosen message format 1440, the remote user may format the body of the message 1450 using formatting tools 1445. The electronic message information may be delivered to the Server Computer 115 using a button, link or other action meant to transmit the electronic message information to the Server Computer 115, such as a "Send" button 1410, a "Send" link, a "Send as Individual Email" button, selecting "Send as Individual Email" from a menu, etc.

Further, the remote user may choose the type of the message being composed/sent (shown as a dropdown list 1455). The type of the message may include Email, Encrypted Email, Text/SMS Message, Email & Text Message, Greeting Card, Individual Email, etc. If the remote user chooses the option for sending individual electronic messages to multiple recipients in visible fields 1560, the indicator of that will be included in the electronic message information and delivered to the Server Computer 115. Optionally, fields "CC" 1425 and/or "BCC" 1430 may be disabled or grayed-out (as shown in FIG. 15) if the option 1560 was selected. Further, the remote user may add one or more variable fields 1570 to the message. A variable field selector 1565 (shown as a dropdown list) may also be present on the web-based graphical user interface. The remote user may type-in variable fields 1570 into the message body 1450 and/or subject line 1435 or add them using the variable field selector 1565. In addition the remote user may specify one or more attachments to be sent with the electronic message.

Figure 3:
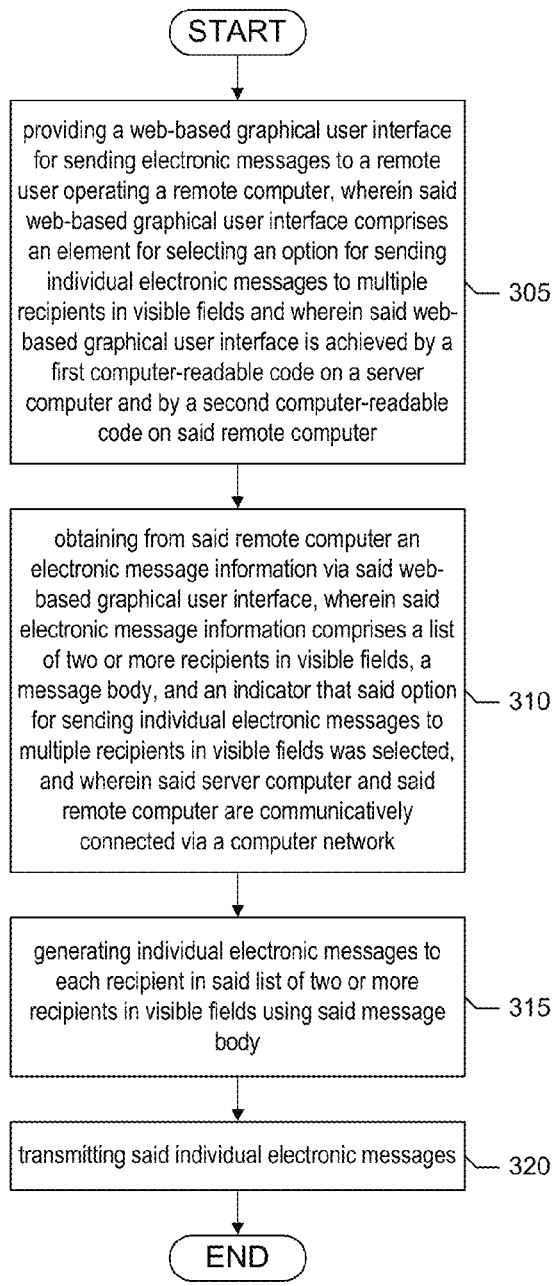
FIG. 3 is a flowchart illustrating an embodiment of a method of the present invention.

An exemplary embodiment of a method of present invention is shown in FIG. 3. The method comprises the steps of: providing a web-based graphical user interface for sending electronic messages to a remote user operating the Remote Computer 105 (step 305). The web-based graphical user interface comprises an element for selecting an option for sending individual electronic messages to multiple recipients in visible fields and the web-based graphical user interface is achieved by a first computer-readable code on the Server Computer 115 and by a second computer-readable code on the Remote Computer 105. Then, obtaining from the Remote Computer 105 an electronic message information via the web-based graphical user interface (step 310). The electronic message information comprises a list of two or more recipients in visible fields, a message body, and an indicator that the option for sending individual electronic messages to multiple recipients in visible fields was selected. The list of two or more recipients is a list of two or more email addresses provided in the "to" and/or "cc" fields; it may also contain recipients' names. The Server Computer 115 and the Remote Computer 105 are communicatively connected via the Network 110. Then, generating individual electronic messages to each recipient in the list of two or more recipients in visible fields using the message body (step 315), and transmitting the individual electronic messages (step 320).

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the Server Computer 115 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The electronic message information may also contain a message subject and other fields. The list of two or more recipients in visible fields may be obtained from the "to" and/or the "cc" fields of the web-based graphical user interface.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the Server Computer 115. Tagging of the variable fields may be implemented in a variety of ways. For example, different characters or combination of characters can be used.

If the remote user chooses the option for sending individual electronic messages to multiple recipients in visible fields, the "cc" or/and "bcc" fields on the web-based graphical user interface may be disabled or hidden. Optionally, if the "cc" field and/or the "bcc" field already contain email addresses of recipients, those email addresses may be moved into the "to" field. Alternatively, the method further comprises the step of transmitting a copy of the individual electronic messages to recipients in the "bcc" field of the web-based graphical user interface.

The step of transmitting the individual electronic messages means that at least one electronic message has left the Server Computer 115. The step of transmitting does not require that an electronic message was received by one of the Recipients 120, nor that it was viewed or read.

The Server Computer 115 may be located in a physical datacenter, in a virtual datacenter, in a variety of countries or territories, on a floating device, be connected to the Internet backbone, be connected to a power grid, etc. The floating device may be a marine or naval vessel or ship. The Server Computer 115 may be cooled by air or liquid, such as water, including ocean or sea water. The geographical placement of the Server Computer 115 may be chosen to alleviate some legal requirements, limitations and restrictions with having the Server Computer 115 located within a jurisdiction of a particular country or territory. Thus, the Server Computer 115 may be located within a jurisdiction of a chosen country or territory, or outside of a jurisdiction of any country or territory. The choice of a country or territory may be made by the entity implementing the invention.

Figure 4:
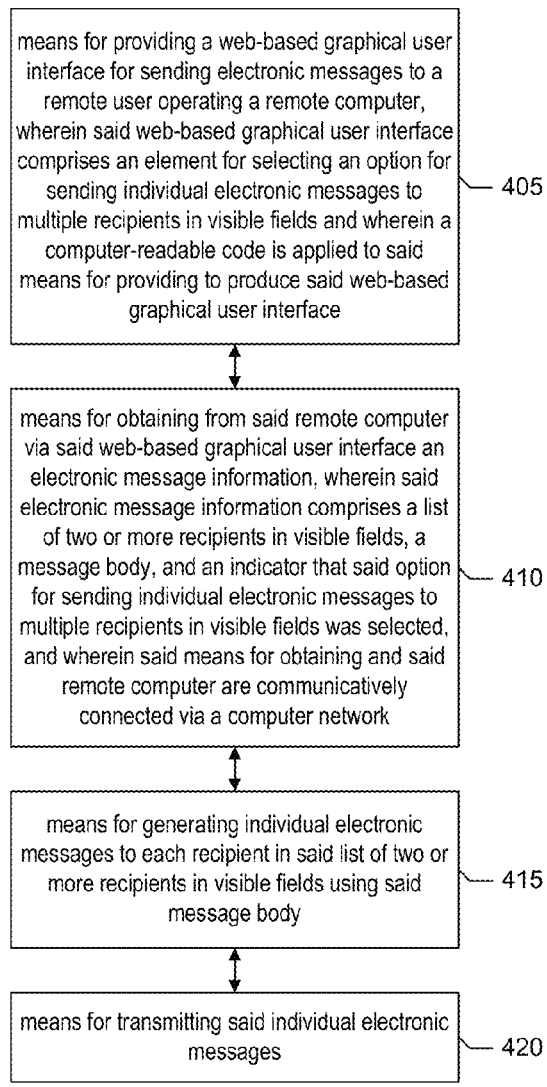
FIG. 4 is a block diagram illustrating an embodiment of a means-plus-function system of the present invention.

Referring to FIG. 4, an exemplary embodiment of the system of the present invention may include: (a) means for providing a web-based graphical user interface for sending electronic messages to a remote user operating a remote computer, wherein the web-based graphical user interface comprises an element for selecting an option for sending individual electronic messages to multiple recipients in visible fields and wherein a computer-readable code is applied to the means for providing to produce the web-based graphical user interface (405), (b) means for obtaining from the remote computer via the web-based graphical user interface an electronic message information, wherein the electronic message information comprises a list of two or more recipients in visible fields, a message body, and an indicator that the option for sending individual electronic messages to multiple recipients in visible fields was selected, and wherein the means for obtaining and the remote computer are communicatively connected via a computer network (410), (c) means for generating individual electronic messages to each recipient in the list of two or more recipients in visible fields using the message body (415), and (d) means for transmitting the individual electronic messages (420).

The means of this embodiment can be substituted by machines, apparatuses, and devices described in this specification or equivalents thereof.

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the means for providing the web-based graphical user interface 405 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The electronic message information may also contain a message subject and other fields. The list of two or more recipients in visible fields is a list of two or more email addresses obtained from the "to" and/or the "cc" fields of the web-based graphical user interface; it may also contain recipients' names.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the means for providing the web-based graphical user interface for sending electronic messages. Tagging of the variable fields may be implemented in a variety of ways. For example, different characters or combination of characters can be used.

The system may further comprise the means for disabling the "cc" field or/and the means for disabling the "bcc" field on the web-based graphical user interface in response to the remote user choosing the option for sending individual electronic messages to multiple recipients in visible fields. Optionally, if the "cc" field and/or the "bcc" field already contain email addresses of recipients, those email addresses may be moved into the "to" field. Alternatively, the system may further comprise the means for transmitting a copy of the individual electronic messages to recipients in the "bcc" field of the web-based graphical user interface.

The means for transmitting the individual electronic messages (420) may ensure that at least one electronic message has left the means for transmitting. The means for transmitting may be not enforcing that an electronic message was received by one of the recipients, or that it was viewed or read.

The means for providing a web-based graphical user interface for sending electronic messages may be located in a physical datacenter, in a virtual datacenter, in a variety of countries or territories, on a floating device, be connected to the Internet backbone, be connected to a power grid, etc. The floating device may be a marine or naval vessel or ship. The means for providing a web-based graphical user interface for sending electronic messages may be cooled by air or liquid, such as water, including ocean or sea water. The geographical placement of the means for providing a web-based graphical user interface for sending electronic messages may be chosen to alleviate some legal requirements, limitations and restrictions with having the means for providing a web-based graphical user interface for sending electronic messages located within a jurisdiction of a particular country or territory. Thus, the means for providing a web-based graphical user interface for sending electronic messages may be located within a jurisdiction of a chosen country or territory, or outside of a jurisdiction of any country or territory. The choice of a country or territory may be made by the entity implementing the invention.

Figure 5:
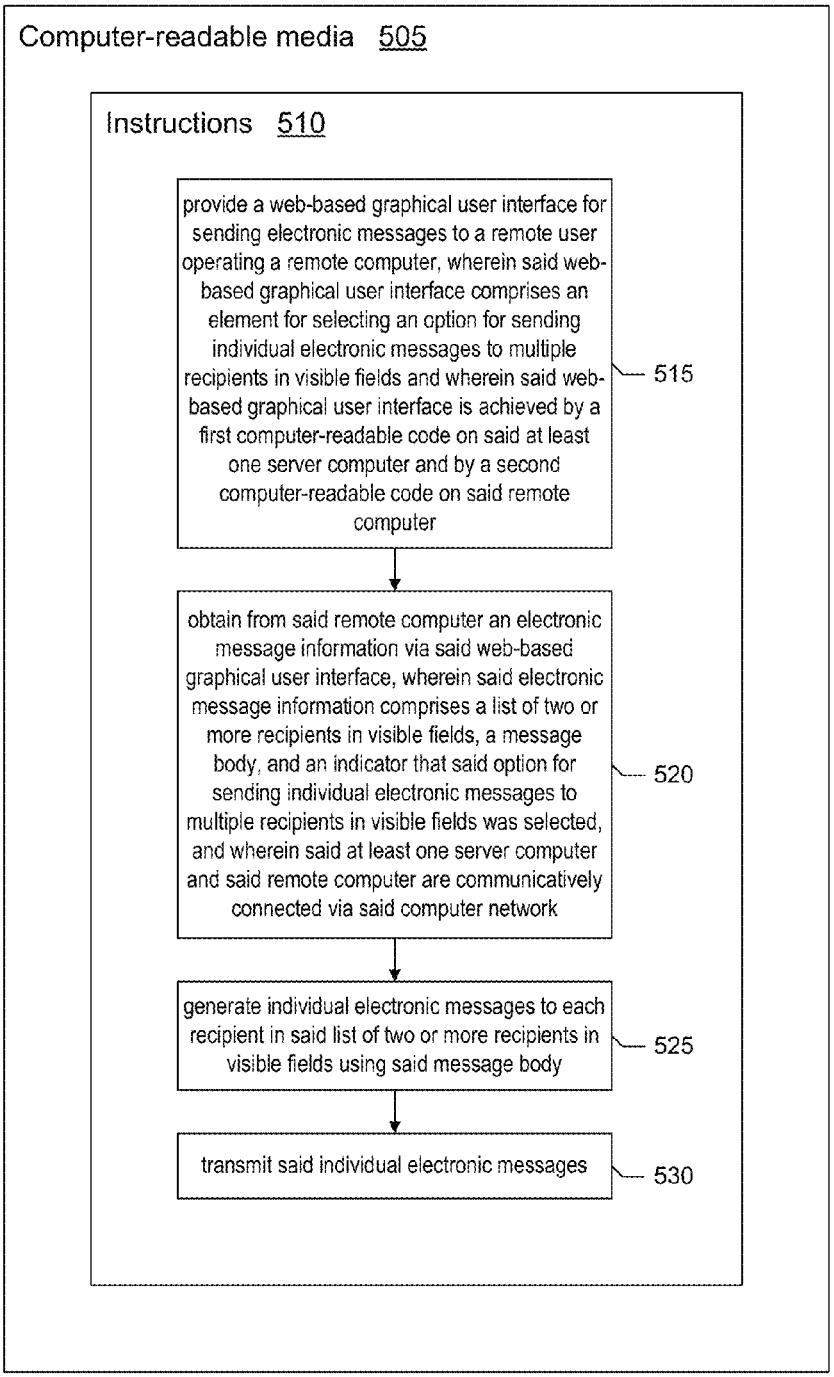
FIG. 5 is a block diagram illustrating an embodiment of a computer-readable media executing instructions in accordance with the teachings of the present invention.

Referring to FIG. 5, an exemplary embodiment of a computer-readable media 505 comprises a plurality of instructions 510 so that, when executed by at least one server computer, communicatively coupled to a computer network, causes the at least one server computer to: (a) provide a web-based graphical user interface for sending electronic messages to a remote user operating a remote computer, wherein the web-based graphical user interface comprises an element for selecting an option for sending individual electronic messages to multiple recipients in visible fields and wherein the web-based graphical user interface is achieved by a first computer-readable code on the at least one server computer and by a second computer-readable code on the remote computer (515), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one server computer and the remote computer are communicatively connected via the computer network (520), (c) generate individual electronic messages to each recipient in the list of two or more recipients in visible fields using the message body (525), and (d) transmit the individual electronic messages (530).

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the at least one server computer may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The electronic message information may also contain a message subject and other fields. The list of two or more recipients in visible fields is a list of two or more email addresses obtained from the "to" and/or the "cc" fields of the web-based graphical user interface; it may also contain recipients' names.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the at least one server computer. Tagging of the variable fields may be implemented in a variety of ways. For example, different characters or combination of characters can be used.

The computer-readable media may further comprise instructions so that, when executed causes the at least one server computer to disable the "cc" field or/and disable the "bcc" field on the web-based graphical user interface in response to the remote user choosing the option for sending individual electronic messages to multiple recipients in visible fields. Optionally, if the "cc" field and/or the "bcc" field already contain email addresses of recipients, those email addresses may be moved into the "to" field. Alternatively, the computer-readable media may further comprise instructions so that, when executed causes the at least one server computer to transmit a copy of the individual electronic messages to recipients in the "bcc" field of the web-based graphical user interface.

The instructions to transmit the individual electronic messages (530) may ensure that at least one electronic message has left the at least one server computer. The instructions to transmit may be not enforcing that an electronic message was received by one of the recipients, or that it was viewed or read.

The at least one server computer may be located in a physical datacenter, in a virtual datacenter, in a variety of countries or territories, on a floating device, be connected to the Internet backbone, be connected to a power grid, etc. The floating device may be a marine or naval vessel or ship. The at least one server computer may be cooled by air or liquid, such as water, including ocean or sea water. The geographical placement of the at least one server computer may be chosen to alleviate some legal requirements, limitations and restrictions with having the at least one server computer located within a jurisdiction of a particular country or territory. Thus, the at least one server computer may be located within a jurisdiction of a chosen country or territory, or outside of a jurisdiction of any country or territory. The choice of a country or territory may be made by the entity implementing the invention.

Figure 6:
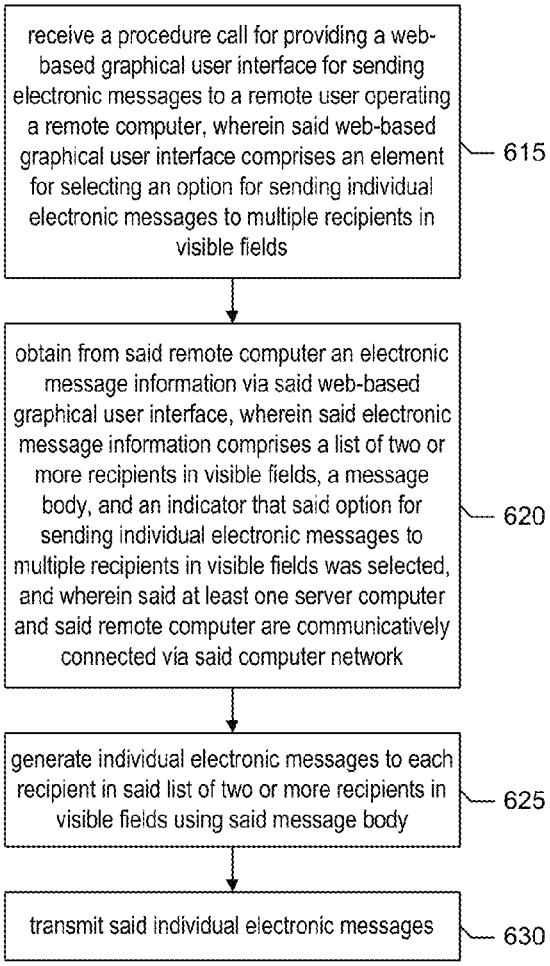
FIG. 6 is a block diagram illustrating an embodiment of an application programming interface comprising a computer-readable code in accordance with the teachings of the present invention.

Referring to FIG. 6, an exemplary embodiment of an application programming interface 605 running on at least one server computer, communicatively coupled to a computer network, comprising computer-readable code 610 that, when executed by the at least one server computer, causes the application programming interface to: (a) receive a procedure call for providing a web-based graphical user interface for sending electronic messages to a remote user operating a remote computer, wherein the web-based graphical user interface comprises an element for selecting an option for sending individual electronic messages to multiple recipients in visible fields (615), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one server computer and the remote computer are communicatively connected via the computer network (620), (c) generate individual electronic messages to each recipient in the list of two or more recipients in visible fields using the message body (625), and (d) transmit the individual electronic messages (630).

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the at least one server computer may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The electronic message information may also contain a message subject and other fields. The list of two or more recipients in visible fields is a list of two or more email addresses obtained from the "to" and/or the "cc" fields of the web-based graphical user interface; it may also contain recipients' names.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the at least one server computer.

Tagging of the variable fields may be implemented in a variety of ways. For example, different characters or combination of characters can be used.

The application programming interface may further comprise computer-readable code that, when executed causes the application programming interface to disable the "cc" field or/and to disable the "bcc" field on the web-based graphical user interface in response to the remote user choosing the option for sending individual electronic messages to multiple recipients in visible fields. Optionally, if the "cc" field and/or the "bcc" field already contain email addresses of recipients, those email addresses may be moved into the "to" field. Alternatively, the application programming interface may further comprise computer-readable code that, when executed causes the application programming interface to transmit a copy of the individual electronic messages to recipients in the "bcc" field of the web-based graphical user interface.

The computer-readable code for transmitting the individual electronic messages (630) may ensure that at least one electronic message has left the at least one server computer. The computer-readable code for transmitting may be not enforcing that an electronic message was received by one of the recipients, or that it was viewed or read.

The at least one server computer may be located in a physical datacenter, in a virtual datacenter, in a variety of countries or territories, on a floating device, be connected to the Internet backbone, be connected to a power grid, etc. The floating device may be a marine or naval vessel or ship. The at least one server computer may be cooled by air or liquid, such as water, including ocean or sea water. The geographical placement of the at least one server computer may be chosen to alleviate some legal requirements, limitations and restrictions with having the at least one server computer located within a jurisdiction of a particular country or territory. Thus, the at least one server computer may be located within a jurisdiction of a chosen country or territory, or outside of a jurisdiction of any country or territory. The choice of a country or territory may be made by the entity implementing the invention.

Figure 12:
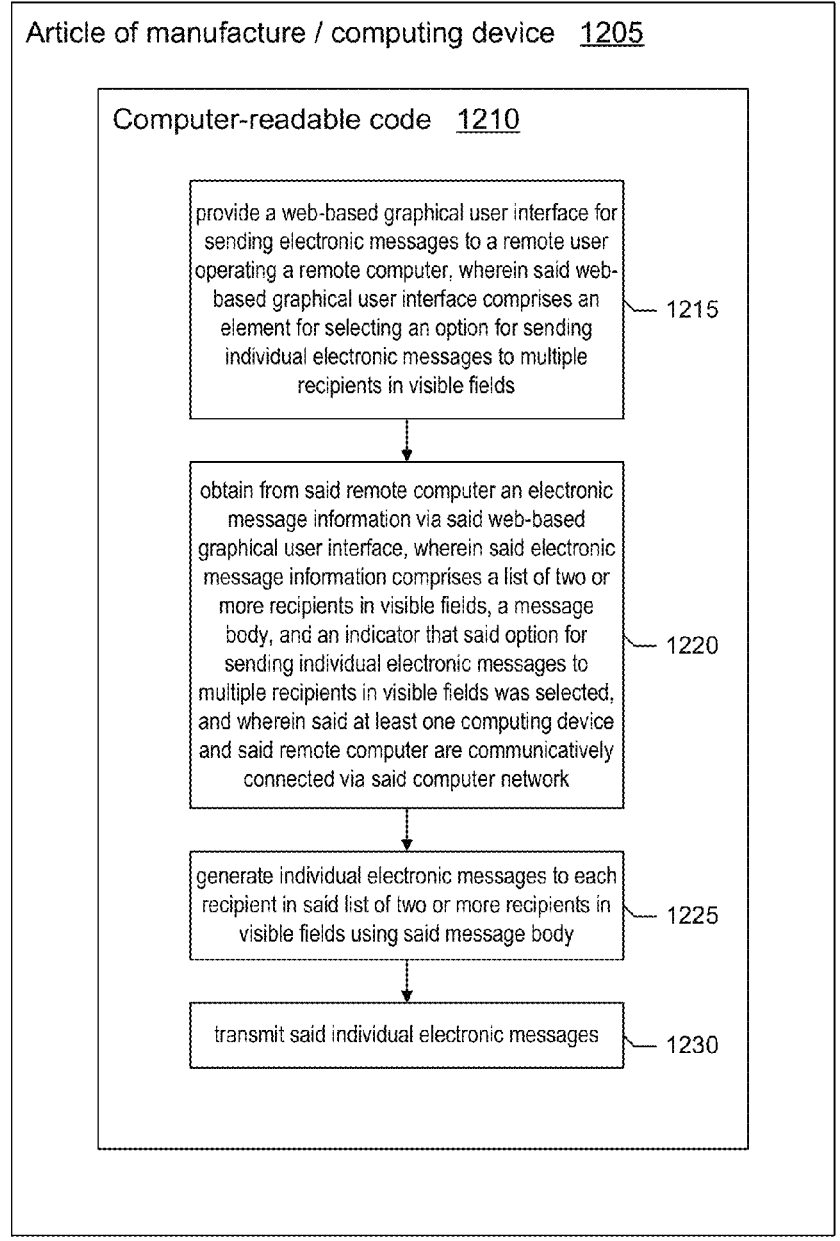
FIGS. 12 and 13 are block diagrams illustrating embodiments of an article of manufacture comprising at least one computing device having a computer-readable code in accordance with the teachings of the present invention.

Referring to FIG. 12, an exemplary embodiment of an article of manufacture 1205 comprising at least one computing device, communicatively coupled to a computer network, having computer-readable code 1210 that, when executed by the at least one computing device, causes the article of manufacture to: (a) provide a web-based graphical user interface for sending electronic messages to a remote user operating a remote computer, wherein the web-based graphical user interface comprises an element for selecting an option for sending individual electronic messages to multiple recipients in visible fields (1215), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one computing device and the remote computer are communicatively connected via the computer network (1220), (c) generate individual electronic messages to each recipient in the list of two or more recipients in visible fields using the message body (1225), and (d) transmit the individual electronic messages (1230).

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the at least one computing device may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The electronic message information may also contain a message subject and other fields. The list of two or more recipients in visible fields is a list of two or more email addresses obtained from the "to" and/or the "cc" fields of the web-based graphical user interface; it may also contain recipients' names.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the at least one computing device. Tagging of the variable fields may be implemented in a variety of ways. For example, different characters or combination of characters can be used.

The at least one computing device may further have computer-readable code that, when executed causes the article of manufacture to disable the "cc" field or/and to disable the "bcc" field on the web-based graphical user interface in response to the remote user choosing the option for sending individual electronic messages to multiple recipients in visible fields. Optionally, if the "cc" field and/or the "bcc" field already contain email addresses of recipients, those email addresses may be moved into the "to" field. Alternatively, at least one computing device may further have computer-readable code that, when executed causes the article of manufacture to transmit a copy of the individual electronic messages to recipients in the "bcc" field of the web-based graphical user interface.

The computer-readable code for transmitting the individual electronic messages (1230) may ensure that at least one electronic message has left the at least one computing device. The computer-readable code for transmitting may be not enforcing that an electronic message was received by one of the recipients, or that it was viewed or read.

The at least one computing device may be located in a physical datacenter, in a virtual datacenter, in a variety of countries or territories, on a floating device, be connected to the Internet backbone, be connected to a power grid, etc. The floating device may be a marine or naval vessel or ship. The at least one computing device may be cooled by air or liquid, such as water, including ocean or sea water. The geographical placement of the at least one computing device may be chosen to alleviate some legal requirements, limitations and restrictions with having the at least one computing device located within a jurisdiction of a particular country or territory. Thus, the at least one computing device may be located within a jurisdiction of a chosen country or territory, or outside of a jurisdiction of any country or territory. The choice of a country or territory may be made by the entity implementing the invention.

Figure 7:
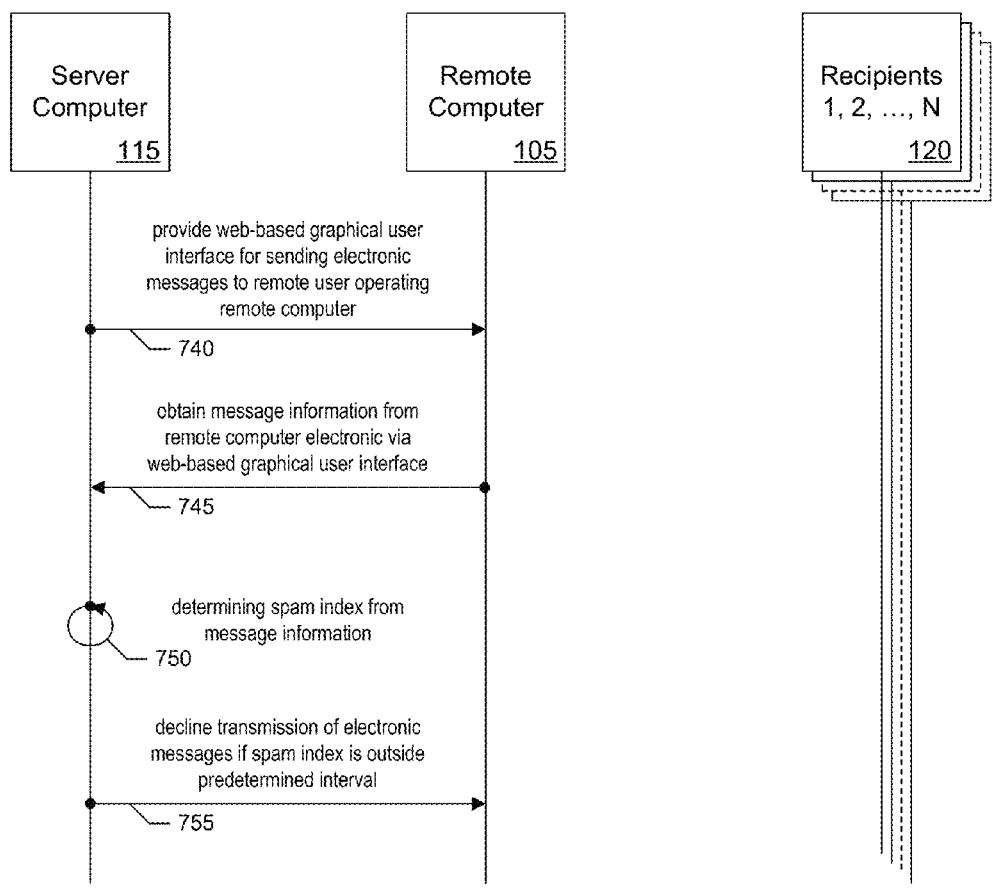
FIG. 7 is an interaction diagram illustrating interactions between the elements of an alternative embodiment of a system of the present invention.

An alternative exemplary embodiment of interactions between the system components is shown in FIG. 7. The Server Computer 115 provides a web-based graphical user interface for sending electronic messages to a remote user operating the Remote Computer 105 (step 740). The web-based graphical user interface comprises at least an element for selecting an option for sending individual electronic messages to multiple recipients in visible fields. The web-based graphical user interface is achieved by a computer-readable code on the Server Computer 115 and the Remote Computer 105.

The Server Computer 115 obtains an electronic message information from the Remote Computer 105 via the web-based graphical user interface (step 745). The electronic message information comprises at least a list of two or more recipients in visible fields, a message body, and an indicator that the option for sending individual electronic messages to multiple recipients in visible fields was selected. The Server Computer 115 and the Remote Computer 105 are communicatively connected to each other via the Network 110.

The Server Computer 115 determines a spam index from the electronic message information obtained from the Remote Computer 105 (step 750). Then, the Server Computer 115 declines transmission of electronic messages to the Recipients 120 if the spam index is outside a predetermined interval (step 755). The Server Computer 115 may notify the remote user operating the Remote Computer 105 that transmission of the messages was declined and the reason for the decline.

The spam index indicates the probability of an electronic message being spam. It may be measured in a variety of ranges, e.g., from 0 to 1, from −1 to 1, from 0 to 100, from −100 to 100, from 0 to ∞, etc. The commonly used range is from 0 to 1, where 1 indicates the highest probability that the message is a spam, and 0 indicates the lowest probability that the message is a spam. "Ham" is a term commonly used to describe non-spam messages. The spam index can be determined, for example, by statistical techniques of analyzing the terms in electronic message body, subject, and/or headers. For example, the Bayesian algorithms are commonly used.

The probability that a particular term is a spam can be calculated as:

$$p(S\mid W) = \frac{p(W\mid S)\cdot p(S)}{p(W\mid S)\cdot p(S) + p(W\mid H)\cdot p(H)},$$

where:

p(S|W) is the probability that a message is a spam (S), knowing that a particular term (W) is in it;

p(S) is the overall probability that any given message is spam (S);

p(W|S) is the probability that the particular term (W) appears in spam messages (S);

p(H) is the overall probability that any given message is not spam or is "ham" (H);

p(W|H) is the probability that the particular term (W) appears in ham messages (H).

The probability that the entire message is spam (or spam index) can be calculated by combining probabilities of individual terms (words, keywords) being spam, for example, as:

$$p = \frac{p_1 p_2 \ldots p_N}{p_1 p_2 \ldots p_N + (1-p_1)(1-p_2) \ldots (1-p_N)},$$

where:

p is the probability that the analyzed message is spam;

$p_1$ is the probability $p(S|W_1)$ that the message is a spam (S) knowing it contains a first term ($W_1$);

$p_2$ is the probability $p(S|W_2)$ that the message is a spam (S) knowing it contains a second term ($W_2$);

$p_N$ is the probability $p(S|W_N)$ that the message is a spam (S) knowing it contains a Nth term ($W_N$).

The formulas shown here are exemplary only. Other formulas and techniques can be used.

If the spam index is outside of a predetermined interval, the transmission of the messages may be declined. For example, if the spam index is measured from 0 to 1 and the spam index of a message is more that 0.8, the transmission of the message may be declined. Of course, other values may be used: 0.3, 0.5, 0.7, 0.72, 0.9, 0.95, etc. In a preferred embodiment the transmission of the message is declined when the spam index of the message is equal to or more than 0.9.

Figure 8:
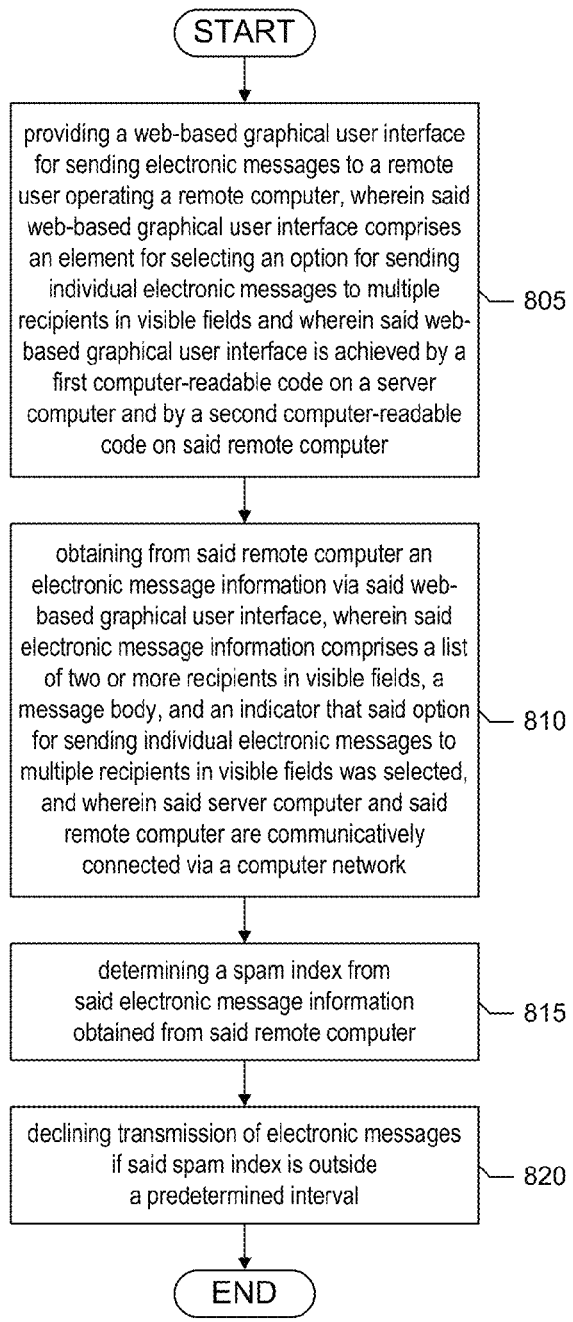
FIG. 8 is a flowchart illustrating an alternative embodiment of a method of the present invention.

An alternative exemplary embodiment of a method of present invention is shown in FIG. 8. The method comprises the steps of: providing a web-based graphical user interface for sending electronic messages to a remote user operating the Remote Computer 105 (step 805). The web-based graphical user interface comprises an element for selecting an option for sending individual electronic messages to multiple recipients in visible fields and the web-based graphical user interface is achieved by a first computer-readable code on the Server Computer 115 and by a second computer-readable code on the Remote Computer 105. Then, obtaining from the Remote Computer 105 an electronic message information via the web-based graphical user interface (step 810). The electronic message information comprises a list of two or more recipients in visible fields, a message body, and an indicator that the option for sending individual electronic messages to multiple recipients in visible fields was selected. The Server Computer 115 and the Remote Computer 105 are communicatively connected via the Network 110. Then, determining a spam index from the electronic message information obtained from the Remote Computer 105 (step 815), and declining transmission of electronic messages if the spam index is outside a predetermined interval (step 820). The Server Computer 115 may notify the remote user operating the Remote Computer 105 that transmission of the messages was declined and the reason for the decline.

Figure 9:
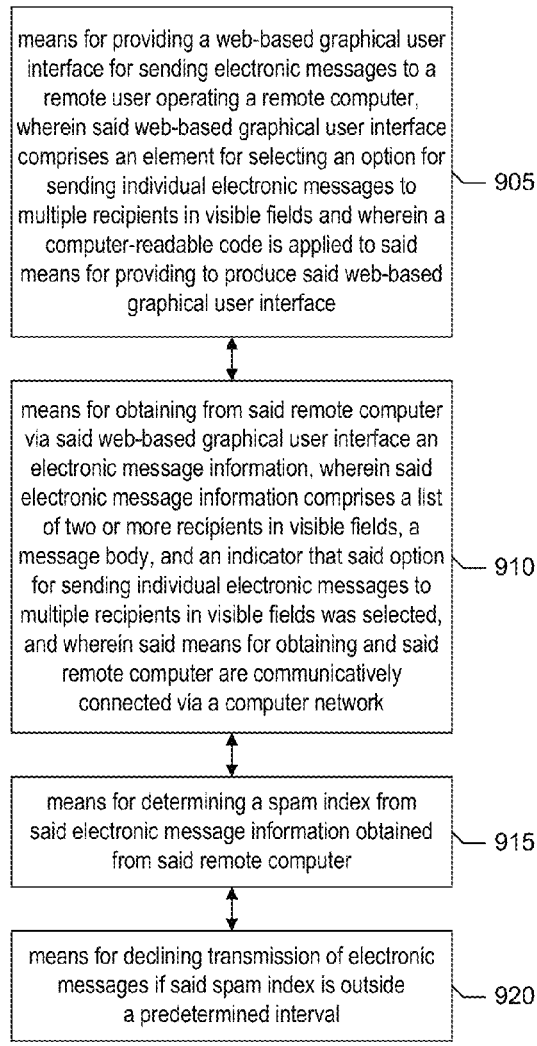
FIG. 9 is a block diagram illustrating an alternative embodiment of a means-plus-function system of the present invention.

Referring to FIG. 9, an alternative exemplary embodiment of the system of the present invention may include: (a) means for providing a web-based graphical user interface for sending electronic messages to a remote user operating a remote computer, wherein the web-based graphical user interface comprises an element for selecting an option for sending individual electronic messages to multiple recipients in visible fields and wherein a computer-readable code is applied to the means for providing to produce the web-based graphical user interface (905), (b) means for obtaining from the remote computer via the web-based graphical user interface an electronic message information, wherein the electronic message information comprises a list of two or more recipients in visible fields, a message body, and an indicator that the option for sending individual electronic messages to multiple recipients in visible fields was selected, and wherein the means for obtaining and the remote computer are communicatively connected via a computer network (910), (c) means for determining a spam index from the electronic message information obtained from the remote computer (915), and (d) means for declining transmission of electronic messages if the spam index is outside a predetermined interval (920). Means for declining may notify the remote user operating the remote computer that transmission of the messages was declined and the reason for the decline.

The means of this embodiment can be substituted by machines, apparatuses, and devices described in this specification or equivalents thereof.

Figure 10:
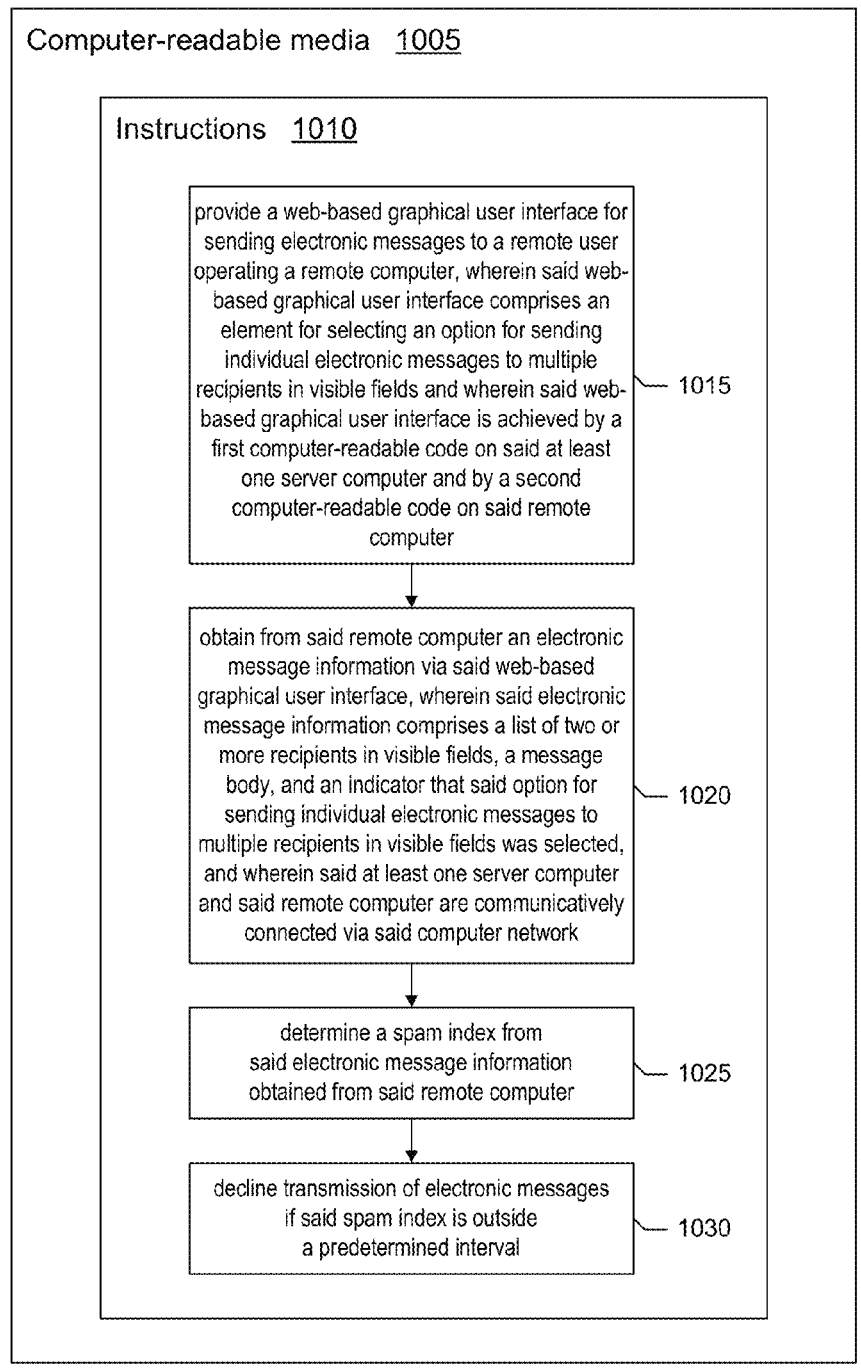
FIG. 10 is a block diagram illustrating an alternative embodiment of a computer-readable media executing instructions in accordance with the teachings of the present invention.

Referring to FIG. 10, an alternative exemplary embodiment of a computer-readable media 1005 comprises a plurality of instructions 1010 so that, when executed by at least one server computer, communicatively coupled to a computer network, causes the at least one server computer to: (a) provide a web-based graphical user interface for sending electronic messages to a remote user operating a remote computer, wherein the web-based graphical user interface comprises an element for selecting an option for sending individual electronic messages to multiple recipients in visible fields and wherein the web-based graphical user interface is achieved by a first computer-readable code on the at least one server computer and by a second computer-readable code on the remote computer (1015), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one server computer and the remote computer are communicatively connected via the computer network (1020), (c) determine a spam index from the electronic message information obtained from the remote computer (1025), and (d) decline transmission of electronic messages if the spam index is outside a predetermined interval (1030). The computer-readable media 1005 may further contain instructions 1010 that notify the remote user operating the remote computer that transmission of the messages was declined and the reason for the decline.

Figure 11:
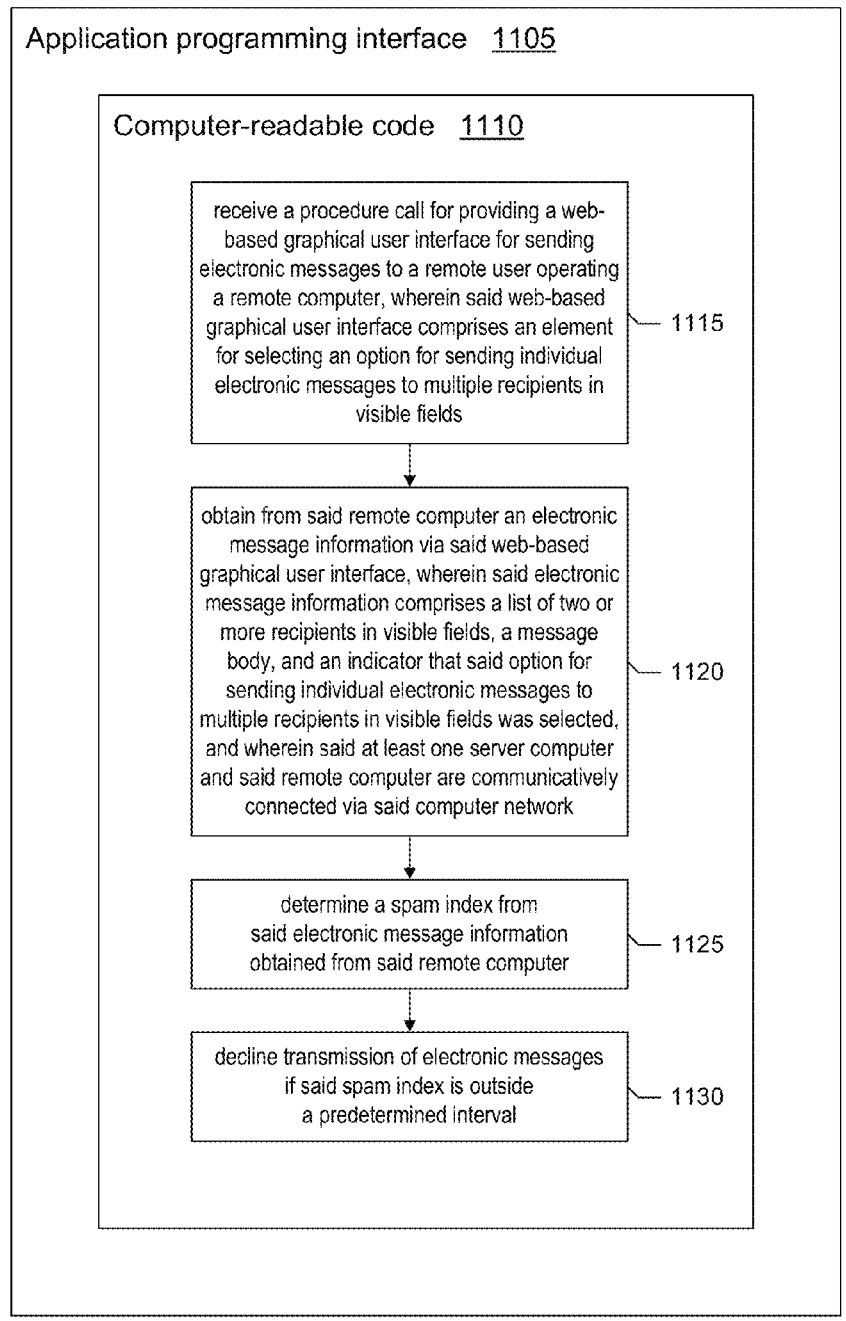
FIG. 11 is a block diagram illustrating an alternative embodiment of an application programming interface comprising a computer-readable code in accordance with the teachings of the present invention.

Referring to FIG. 11, an alternative exemplary embodiment of an application programming interface 1105 running on at least one server computer, communicatively coupled to a computer network, comprising computer-readable code 1110 that, when executed by the at least one server computer, causes the application programming interface to: (a) receive a procedure call for providing a web-based graphical user interface for sending electronic messages to a remote user operating a remote computer, wherein the web-based graphical user interface comprises an element for selecting an option for sending individual electronic messages to multiple recipients in visible fields (1115), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one server computer and the remote computer are communicatively connected via the computer network (1120), (c) determine a spam index from the electronic message information obtained from the remote computer (1125), and (d) decline transmission of electronic messages if the spam index is outside a predetermined interval (1130). The application programming interface 1105 may further comprise computer-readable code 1110 that notifies the remote user operating the remote computer that transmission of the messages was declined and the reason for the decline.

Figure 13:
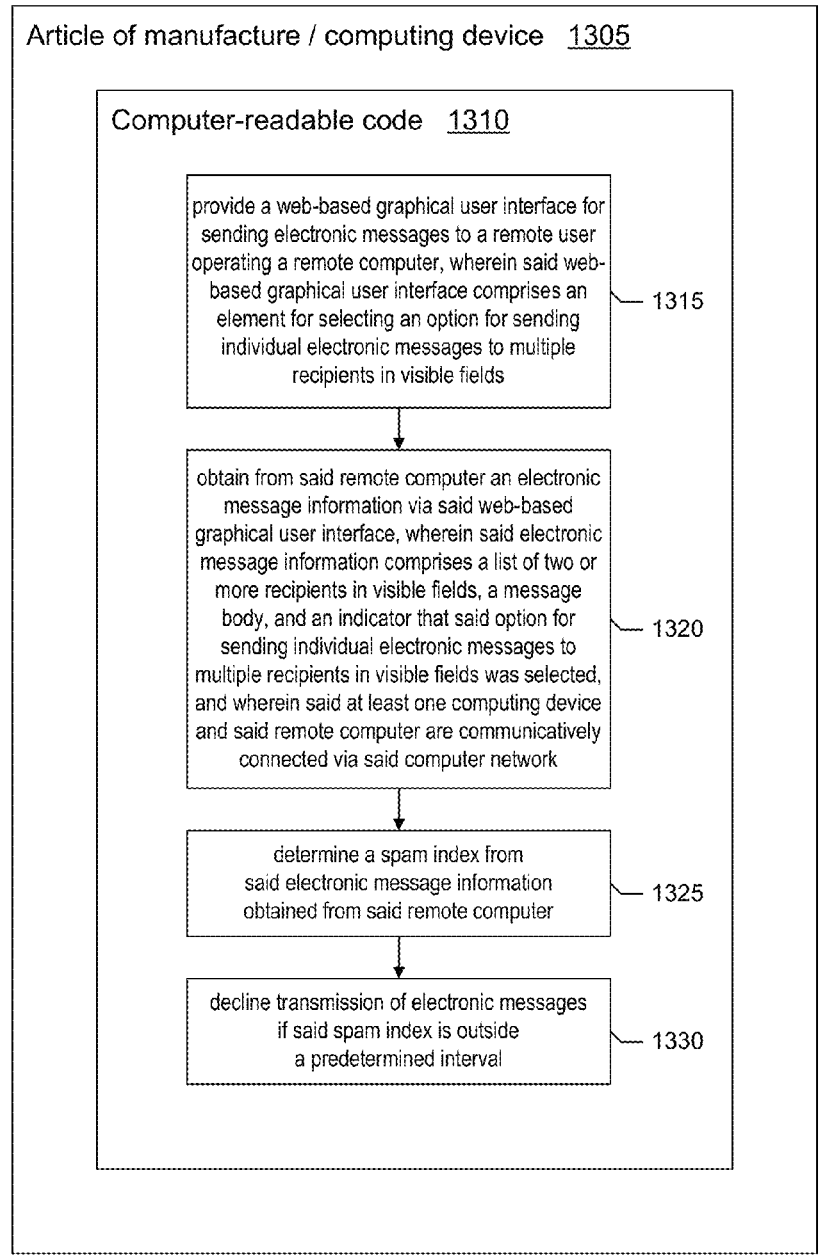

Referring to FIG. 13, an alternative exemplary embodiment of an article of manufacture 1305 comprising at least one computing device, communicatively coupled to a computer network, having computer-readable code 1310 that, when executed by the at least one computing device, causes the article of manufacture to: (a) provide a web-based graphical user interface for sending electronic messages to a remote user operating a remote computer, wherein the web-based graphical user interface comprises an element for selecting an option for sending individual electronic messages to multiple recipients in visible fields (1315), (b) obtain from the remote computer an electronic message information via the web-based graphical user interface, wherein the electronic message information comprises a list of two or more recipients in visible fields, a message body, and an indicator that the option for sending individual electronic messages to multiple recipients in visible fields was selected, and wherein the at least one computing device and the remote computer are communicatively connected via the computer network (1320), (c) determine a spam index from the electronic message information obtained from the remote computer (1325), and (d) decline transmission of electronic messages if the spam index is outside a predetermined interval (1330). The at least one computing device may further have computer-readable code 1310 that notifies the remote user operating the remote computer that transmission of the messages was declined and the reason for the decline.

Figure 16:
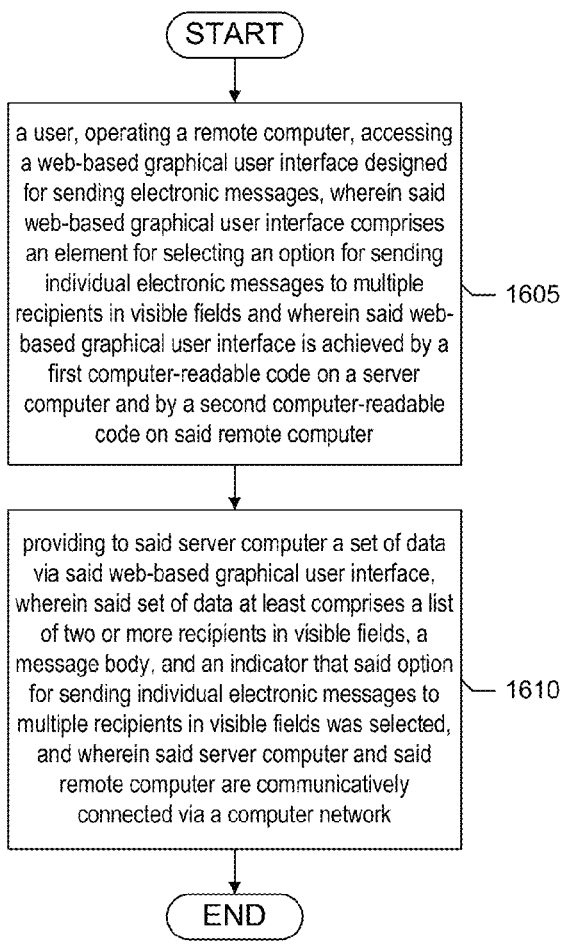
FIG. 16 is a flowchart illustrating an embodiment of a method of the present invention from prospective of a user.

An exemplary embodiment of a method of present invention executed by a user is shown in FIG. 16. The method comprises the steps of: a user (a remote user, an end-user), operating a Remote Computer 105, accessing a web-based graphical user interface designed for sending electronic messages. The web-based graphical user interface comprises an element for selecting an option for sending individual electronic messages to multiple recipients in visible fields and the web-based graphical user interface is achieved (produced, generated) by a first computer-readable code on a Server Computer 115 and by a second computer-readable code on the Remote Computer 105 (step 1605). Then, providing to the Server Computer 115 a set of data via the web-based graphical user interface, where the set of data at least comprises a list of two or more recipients in visible fields, a message body, and an indicator that the option for sending individual electronic messages to multiple recipients in visible fields was selected (step 1610). The list of two or more recipients is a list of two or more email addresses provided in the "to" and/or "cc" fields; it may also contain recipients' names. The Server Computer 115 and the Remote Computer 105 are communicatively connected via the Network 110.

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the Server Computer 115 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the set of data may comprise text, graphics, embedded objects, etc. The set of data may also contain a message subject and other fields. The list of two or more recipients in visible fields may be obtained from the "to" and/or the "cc" fields of the web-based graphical user interface.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the Server Computer 115. Tagging of the variable fields may be implemented in a variety of ways. For example, different characters or combination of characters can be used.

If the user chooses the option for sending individual electronic messages to multiple recipients in visible fields, the "cc" or/and "bcc" fields on the web-based graphical user interface may be disabled or hidden. Optionally, if the "cc" field and/or the "bcc" field already contain email addresses of recipients, those email addresses may be moved into the "to" field.

Figure 17:
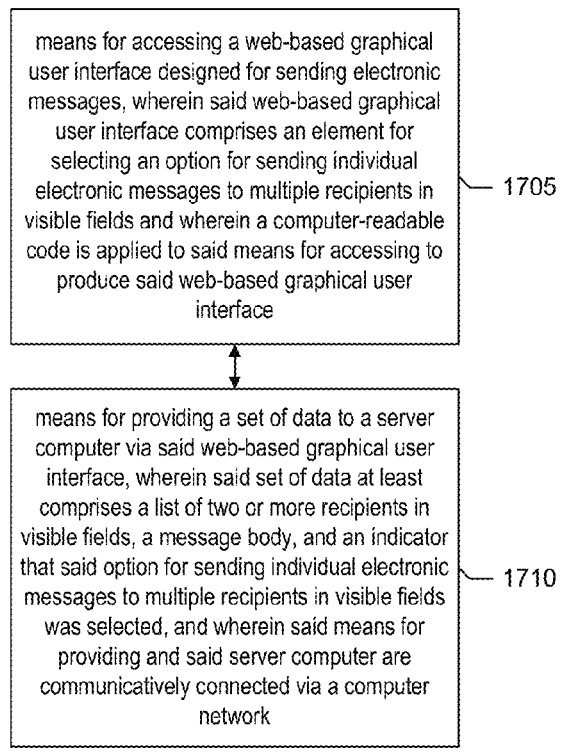
FIG. 17 is a block diagram illustrating an embodiment of a user's means-plus-function system of the present invention.

Referring to FIG. 17, an exemplary embodiment of the user's system of the present invention may include: (a) means for accessing a web-based graphical user interface designed for sending electronic messages, wherein the web-based graphical user interface comprises an element for selecting an option for sending individual electronic messages to multiple recipients in visible fields and wherein a computer-readable code is applied to the means for accessing to produce (generate, render, achieve) the web-based graphical user interface (1705), and (b) means for providing a set of data to a server computer via the web-based graphical user interface, wherein the set of data at least comprises a list of two or more recipients in visible fields, a message body, and an indicator that the option for sending individual electronic messages to multiple recipients in visible fields was selected, and wherein the means for providing and the server computer are communicatively connected via a computer network (1710).

The means of this embodiment can be substituted by machines, apparatuses, and devices described in this specification or equivalents thereof.

The element for selecting the option for sending individual electronic messages to multiple recipients in visible fields may include a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the means for providing the web-based graphical user interface 405 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message body obtained as part of the electronic message information may comprise text, graphics, embedded objects, etc. The set of data may also contain a message subject and other fields. The list of two or more recipients in visible fields is a list of two or more email addresses obtained from the "to" and/or the "cc" fields of the web-based graphical user interface; it may also contain recipients' names.

The message body and the message subject may contain variable (merge, substitute, replaceable) fields. E.g., "Dear <<Name>>, we write you . . . " or "This message was sent to {% Email Address %}." When individual messages are generated, the variable fields will be replaced with the actual information of a particular recipient or with other information, e.g., today's date, current time, etc. The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the means for providing the web-based graphical user interface for sending electronic messages. Tagging of the variable fields may be implemented in a variety of ways. For example, different characters or combination of characters can be used.

The system may further comprise the means for disabling the "cc" field or/and the means for disabling the "bcc" field on the web-based graphical user interface in response to the user choosing the option for sending individual electronic messages to multiple recipients in visible fields. Optionally, if the "cc" field and/or the "bcc" field already contain email addresses of recipients, those email addresses may be moved into the "to" field.

Figure 18:
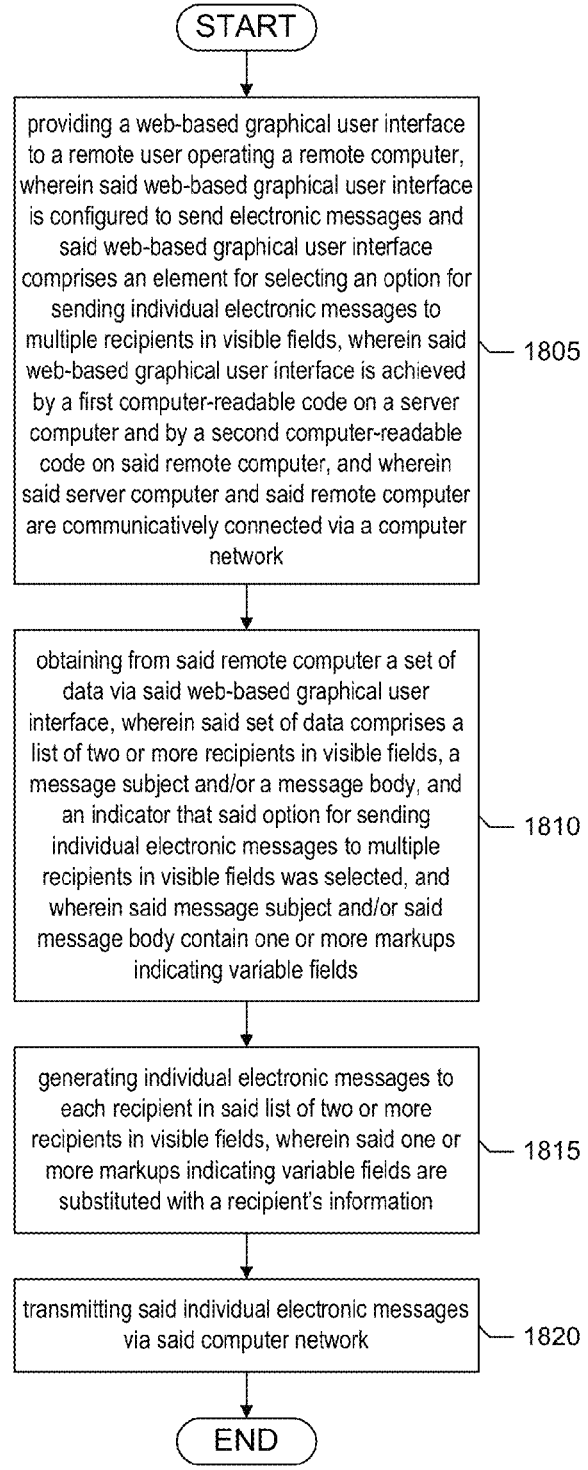
FIG. 18 is a flowchart illustrating an embodiment of a method for embedding variable fields in individual email messages sent via a web-based graphical user interface.

An exemplary embodiment of a method for embedding variable fields in individual email messages sent via a web-based graphical user interface is shown in FIG. 18. The method comprises the following steps. Providing a web-based graphical user interface to a remote user operating the Remote Computer 105 (step 1805). The web-based graphical user interface is configured to send electronic messages and comprises an element for selecting an option for sending individual electronic messages to multiple recipients in visible fields. The web-based graphical user interface is achieved by a first computer-readable code on the Server Computer 115 and by a second computer-readable code on the remote computer. The Server Computer 115 and the Remote Computer 105 are communicatively connected via the computer Network 110.

Then, obtaining from the Remote Computer 105 a set of data via the web-based graphical user interface (step 1810). The set of data comprises a list of two or more recipients in visible fields, a message subject and/or a message body, and an indicator that the option for sending individual electronic messages to multiple recipients in visible fields was selected. The message subject and/or the message body contain one or more markups indicating variable fields.

Then, generating individual electronic messages to each recipient in the list of two or more recipients in visible fields (step 1815). The one or more markups indicating variable fields are substituted with a recipient's information.

Then, transmitting the individual electronic messages via the computer Network 110 (step 1820).

Further, the method may comprise the steps of: saving a public key into a DNS record of a domain name, creating a digital signature using the message subject and/or the message body and a private key corresponding to the public key saved into the DNS record, and appending the digital signature to the individual electronic messages. The individual electronic messages are transmitted from an email address associated with the domain name.

Also, the method may comprise the step of providing a second web-based graphical user interface to the remote user operating the Remote Computer 105. The second web-based graphical user interface is configured to register a domain name to the remote user.

Alternatively, the second web-based graphical user interface is configured to register a domain name to the remote user with private registration. In this case the information of the remote user is replaced with the information of a proxy.

In addition, the method may comprise the step of determining whether an automated script is used for sending bulk electronic messages via the web-based graphical user interface.

In one embodiment the steps of the method are performed by a domain name registrar.

The method may further comprise the step of transmitting a copy of the individual electronic messages with one or more markups indicating variable fields substituted with the recipient's information to recipients in a "bcc" field of the web-based graphical user interface.

The element for selecting the option for sending individual electronic messages to multiple recipients in visible fields may be implemented on the web-based graphical user interface in a variety of ways, for example as a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the Server Computer 115 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message subject and/or the message body obtained as part of the set of data may comprise text, graphics, embedded objects, etc. The set of data may also contain other fields. The list of two or more recipients in visible fields may be obtained from the "to" and/or the "cc" fields of the web-based graphical user interface.

The message subject and/or the message body may contain one or more markups indicating variable (merge, substitute, replaceable) fields. E.g., "Dear <<Name>>, we write you . . . " or "This message was sent to {% Email Address %}." When individual messages are generated, the variable fields will be replaced with the actual information of a particular recipient (e.g., recipient's name, recipient's date of birth, etc.) or with other information (e.g., today's date, current time, etc.). The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the Server Computer 115. Marking-up or tagging of the variable fields may be implemented in a variety of ways. For example, different characters or combination of characters can be used.

Further, the method may comprise the step of providing a selector field 1565 on the web-based graphical user interface configured to insert one or more markups indicating variable fields into the message subject and/or into the message body.

If the user chooses the option for sending individual electronic messages to multiple recipients in visible fields, the "cc" or/and "bcc" fields on the web-based graphical user interface may be disabled or hidden. Optionally, if the "cc" field and/or the "bcc" field already contain email addresses of recipients, those email addresses may be moved into the "to" field.

Figure 19:
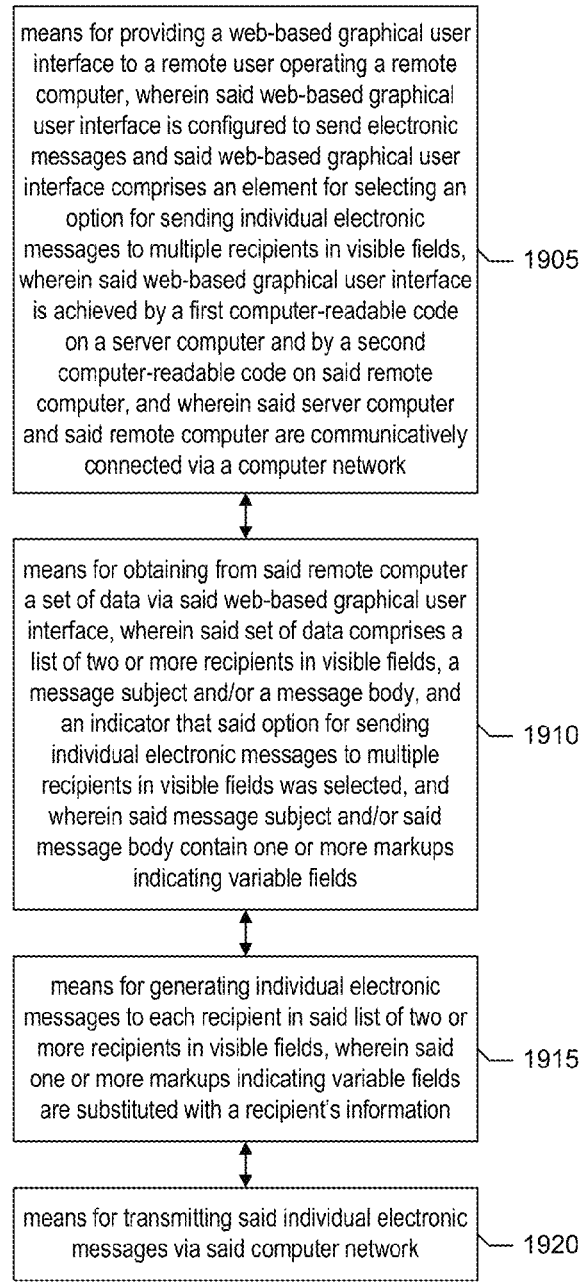
FIG. 19 is a block diagram illustrating an embodiment of a means-plus-function system for embedding variable fields in individual email messages sent via a web-based graphical user interface.
Figure 20:
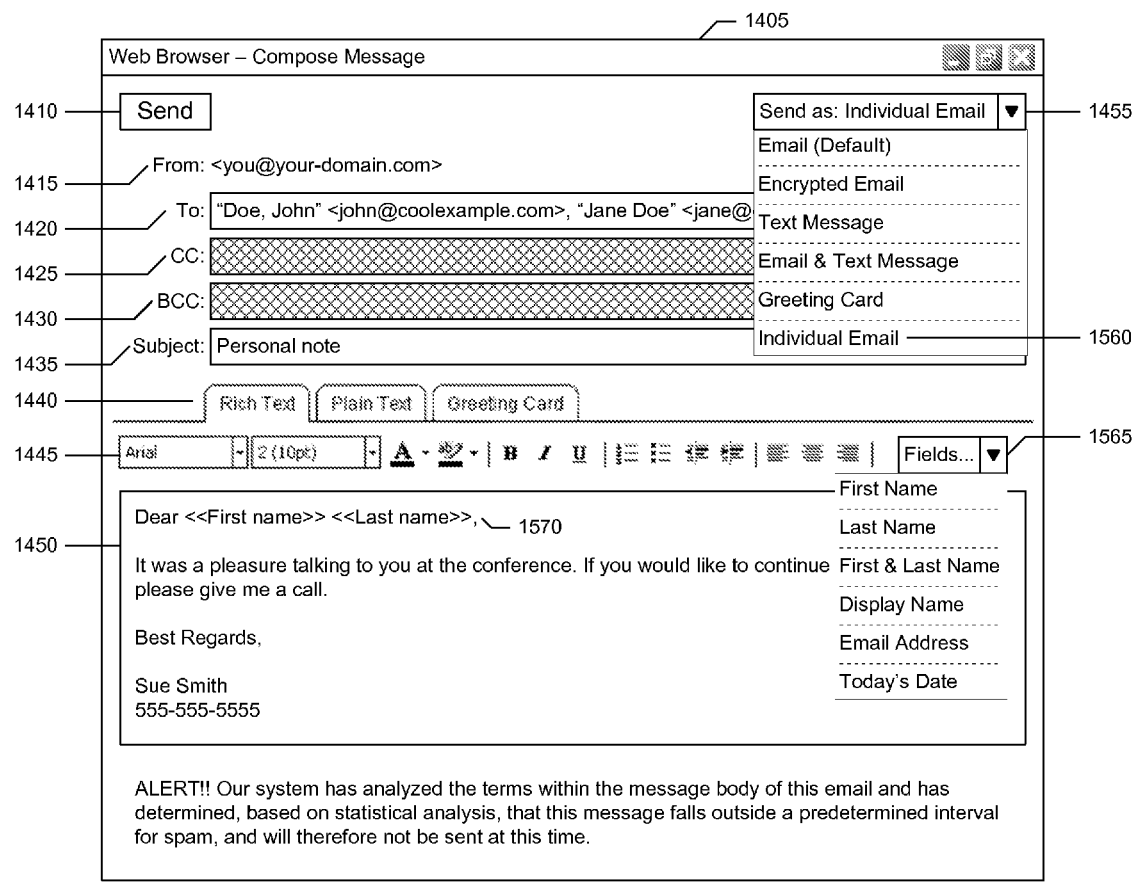
FIG. 20 is a mockup drawing of a web browser displaying a sample web-based graphical user interface in accordance with the teachings of the present invention.

An exemplary embodiment of a system for embedding variable fields in individual email messages sent via a web-based graphical user interface is shown in FIG. 19. The system comprises the following elements. Means for providing a web-based graphical user interface to a remote user operating the Remote Computer 105 (step 1905). The web-based graphical user interface is configured to send electronic messages and comprises an element for selecting an option for sending individual electronic messages to multiple recipients in visible fields. The web-based graphical user interface is achieved by a first computer-readable code on the Server Computer 115 and by a second computer-readable code on the remote computer. The Server Computer 115 and the Remote Computer 105 are communicatively connected via the computer Network 110.

Means for obtaining from the Remote Computer 105 a set of data via the web-based graphical user interface (step 1910). The set of data comprises a list of two or more recipients in visible fields, a message subject and/or a message body, and an indicator that the option for sending individual electronic messages to multiple recipients in visible fields was selected. The message subject and/or the message body contain one or more markups indicating variable fields.

Means for generating individual electronic messages to each recipient in the list of two or more recipients in visible fields (step 1915). The one or more markups indicating variable fields are substituted with a recipient's information.

Means for transmitting the individual electronic messages via the computer Network 110 (step 1920).

Further, the system may comprise means for saving a public key into a DNS record of a domain name, means for creating a digital signature using the message subject and/or the message body and a private key corresponding to the public key saved into the DNS record, and means for appending the digital signature to the individual electronic messages. The individual electronic messages are transmitted from an email address associated with the domain name.

Also, the system may comprise means for providing a second web-based graphical user interface to the remote user operating the Remote Computer 105. The second web-based graphical user interface is configured to register a domain name to the remote user.

Alternatively, the second web-based graphical user interface is configured to register a domain name to the remote user with private registration. In this case the information of the remote user is replaced with the information of a proxy.

In addition, the system may comprise the means for determining whether an automated script is used for sending bulk electronic messages via the web-based graphical user interface.

In one embodiment the system is maintained by a domain name registrar.

The system may further comprise the means for transmitting a copy of the individual electronic messages with one or more markups indicating variable fields substituted with the recipient's information to recipients in a "bcc" field of the web-based graphical user interface.

The element for selecting the option for sending individual electronic messages to multiple recipients in visible fields may be implemented on the web-based graphical user interface in a variety of ways, for example as a checkbox, a radio button, a dropdown, a list, a selector, a button, etc. The element may be textual or graphical. The HTML implementation of the element may include "input type="checkbox"", "input type="radio"", "select", "option", etc. The web-based graphical user interface or the Server Computer 115 may limit the maximum number of recipients in the list of two or more recipients in visible fields. The maximum number of recipients may be 2, 10, 20, 25, 50, 100, etc. In a preferred embodiment, the maximum number of recipients is less or equal 100. The message subject and/or the message body obtained as part of the set of data may comprise text, graphics, embedded objects, etc. The set of data may also contain other fields. The list of two or more recipients in visible fields may be obtained from the "to" and/or the "cc" fields of the web-based graphical user interface.

The message subject and/or the message body may contain one or more markups indicating variable (merge, substitute, replaceable) fields. E.g., "Dear <<Name>>, we write you . . . " or "This message was sent to {% Email Address %}." When individual messages are generated, the variable fields will be replaced with the actual information of a particular recipient (e.g., recipient's name, recipient's date of birth, etc.) or with other information (e.g., today's date, current time, etc.). The "Email Address" variable field may be populated with the email address provided by the user in the address fields. The name variable fields (e.g., "First Name", "Last Name", "First & Last Name", "Display Name", etc.) may be populated with the names supplied by the user in the address fields or from user's contacts saved on the Server Computer 115. Marking-up or tagging of the variable fields may be implemented in a variety of ways. For example, different characters or combination of characters can be used.

Further, the system may comprise the means for providing a selector field 1565 on the web-based graphical user interface configured to insert one or more markups indicating variable fields into the message subject and/or into the message body.

If the user chooses the option for sending individual electronic messages to multiple recipients in visible fields, the "cc" or/and "bcc" fields on the web-based graphical user interface may be disabled or hidden. Optionally, if the "cc" field and/or the "bcc" field already contain email addresses of recipients, those email addresses may be moved into the "to" field.

The means of this embodiment can be substituted by machines, apparatuses, and devices described in this specification or equivalents thereof.

U.S. patent application Ser. No. 10/418,006 entitled "Mail Server Probability Spam Filter" filed on Apr. 17, 2003, issued as U.S. Pat. No. 7,320,020 on Jan. 15, 2008, is hereby incorporated in its entirety by reference.

U.S. patent application Ser. No. 10/703,245 entitled "Integrated Web Based Email System and Document Storage Manager" filed on Nov. 7, 2003 is hereby incorporated in its entirety by reference.

U.S. patent application Ser. No. 10/977,373 entitled "Tracking Domain Name Related Reputation" filed on Oct. 29, 2004 is hereby incorporated in its entirety by reference.

U.S. patent application Ser. No. 11/011,630 entitled "Email Filtering System and Method" filed on Dec. 14, 2004, issued as U.S. Pat. No. 7,580,982 on Aug. 25, 2009, is hereby incorporated in its entirety by reference.

U.S. patent application Sr. No. 11/030,612 entitled "Electronic Mail System and Method" filed on Jan. 6, 2005 is hereby incorporated in its entirety by reference.

U.S. patent application Ser. No. 11/184,247 entitled "Generating PKI Email Accounts on a Web-Based Email System" filed on Jul. 19, 2005 is hereby incorporated in its entirety by reference.

U.S. patent application Ser. No. 11/184,259 entitled "Sending Digitally Signed Emails via a Web-Based Email System" filed on Jul. 19, 2005 is hereby incorporated in its entirety by reference.

U.S. patent application Ser. No. 11/184,519 entitled "Receiving Encrypted Emails via a Web-Based Email System" filed on Jul. 19, 2005 is hereby incorporated in its entirety by reference.

U.S. patent application Ser. No. 11/419,160 entitled "Electronic Mail System Using Email Tickler" filed on May 18, 2006 is hereby incorporated in its entirety by reference.

U.S. patent application Ser. No. 11/419,176 entitled "Electronic Mail Method Using Email Tickler" filed on May 18, 2006 is hereby incorporated in its entirety by reference.

U.S. patent application Ser. No. 11/873,329 entitled "Mail Server Probability Spam Filter" filed on Oct. 16, 2007, issued as U.S. Pat. No. 7,523,168 on Apr. 21, 2009, is hereby incorporated in its entirety by reference.

U.S. patent application Ser. No. 12/462,927 entitled "Proxy Email Method and System" filed on Aug. 10, 2009 is hereby incorporated in its entirety by reference.

U.S. patent application Ser. No. 12/652,832 entitled "Proxy Email Method and System" filed on Jan. 6, 2010 is hereby incorporated in its entirety by reference.

U.S. patent application Ser. No. 12/652,847 entitled "Proxy Email Method and System" filed on Jan. 6, 2010 is hereby incorporated in its entirety by reference.

The features of the present invention might allow for substantial time saving by sending email messages to multiple recipients at once. Simultaneously, it would allow users to be socially compliant, but still personable, when sending email messages to a list of addressees. The present invention alleviates the need for specialized websites, tools, and software to send personalized email messages to multiple recipients.

All embodiments of the present invention may further be limited and implemented with any and all limitations disclosed in this specification or in the documents incorporated in this patent application by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
   a) providing a web-based graphical user interface to a remote user operating a remote computer, wherein said web-based graphical user interface is configured to send electronic messages and said web-based graphical user interface comprises an element for selecting an option for generating and transmitting individual electronic messages to each of a plurality of recipients listed in visible fields, wherein said web-based graphical user interface is achieved by a first computer-readable code on a server computer and by a second computer-readable code on said remote computer, and wherein said server computer and said remote computer are communicatively connected via a computer network,
   b) obtaining from said remote computer a set of data via said web-based graphical user interface, wherein said set of data comprises a list of two or more recipients in visible fields, a message subject and/or a message body comprising one or more variable fields personalized, according to a name and an email address in said visible fields, to each of said plurality of recipients in each said message body, and an indicator that said option for sending individual electronic messages to multiple recipients in visible fields was selected, and wherein said message subject and/or said message body contain one or more markups indicating variable fields,
   c) generating individual electronic messages to each recipient in said list of two or more recipients in visible fields, wherein said one or more markups indicating variable fields are substituted with a recipient's information,
   d) determining a spam index from said set of data obtained from said remote computer, said spam index being determined by applying at least one statistical analysis to one or more terms in said message body to determine a predetermined interval,
   e) declining transmission of said individual electronic messages if said spam index is outside said predetermined interval, and
   f) transmitting said individual electronic messages via said computer network if said spam index is within said predetermined interval.

2. The method of claim 1, further comprising the steps of:
   e) saving a public key into a DNS record of a domain name,
   f) creating a digital signature using said message subject and/or said message body and a private key corresponding to said public key saved into said DNS record, and
   g) appending said digital signature to said individual electronic messages, wherein said individual electronic messages are transmitted from an email address associated with said domain name.

3. The method of claim 1, further comprising the step of:
   e) providing a second web-based graphical user interface to said remote user operating said remote computer, wherein said second web-based graphical user interface is configured to register a domain name to said remote user.

4. The method of claim 1, further comprising the step of:
   e) providing a second web-based graphical user interface to said remote user operating said remote computer, wherein said second web-based graphical user interface is configured to register a domain name to said remote user with private registration.

5. The method of claim 1, further comprising the step of:
   e) determining whether an automated script is used for sending bulk electronic messages via said web-based graphical user interface.

6. The method of claim 1, wherein the steps of said method are performed by a domain name registrar.

7. The method of claim 1, wherein said element for selecting said option for sending individual electronic messages to multiple recipients in visible fields is implemented on said web-based graphical user interface as a checkbox.

8. The method of claim 1, wherein said element for selecting said option for sending individual electronic messages to multiple recipients in visible fields is implemented on said web-based graphical user interface as a radio button.

9. The method of claim 1, wherein said element for selecting said option for sending individual electronic messages to multiple recipients in visible fields is implemented on said web-based graphical user interface as a dropdown.

10. The method of claim 1, wherein said element for selecting said option for sending individual electronic messages to multiple recipients in visible fields is implemented on said web-based graphical user interface as a list.

11. The method of claim 1, wherein said list of two or more recipients in visible fields used for generating said individual electronic messages to each recipient is obtained from a "to" field of said web-based graphical user interface.

12. The method of claim 1, wherein said list of two or more recipients in visible fields used for generating said individual electronic messages to each recipient is obtained from a "cc" field of said web-based graphical user interface.

13. The method of claim 1, further comprising the step of:
e) transmitting a copy of said individual electronic messages with said one or more markups indicating variable fields substituted with said recipient's information to recipients in a "bcc" field of said web-based graphical user interface.

14. The method of claim 1, further comprising the step of:
e) disabling a "bcc" field of said web-based graphical user interface in response to said remote user selecting said option for sending individual electronic messages to multiple recipients in visible fields.

15. The method of claim 1, further comprising the step of:
e) moving a recipient's address from a "bcc" field of said web-based graphical user interface into a "to" field or a "cc" field of said web-based graphical user interface in response to said remote user selecting said option for sending individual electronic messages to multiple recipients in visible fields.

16. The method of claim 1, wherein said web-based graphical user interface limits a number of recipients of said individual electronic messages in said list of two or more recipients in visible fields.

17. The method of claim 1, wherein said web-based graphical user interface limits a number of recipients of said individual electronic messages in said list of two or more recipients in visible fields to a maximum of 100.

18. The method of claim 1, wherein said message subject obtained from said remote computer as part of said set of data via said web-based graphical user interface contains graphics.

19. The method of claim 1, wherein said message body obtained from said remote computer as part of said set of data via said web-based graphical user interface contains graphics.

20. The method of claim 1, wherein said recipient's information used for substituting said one or more markups indicating variable fields in said message subject and/or in said message body obtained via said web-based graphical user interface is a recipient's name.

21. The method of claim 1, wherein said recipient's information used for substituting said one or more markups indicating variable fields in said message subject and/or in said message body obtained via said web-based graphical user interface is a recipient's email address.

22. The method of claim 1, wherein said recipient's information used for substituting said one or more markups indicating variable fields in said message subject and/or in said message body obtained via said web-based graphical user interface is a recipient's date of birth.

23. The method of claim 1, further comprising the step of:
e) substituting said one or more markups indicating variable fields in said message subject and/or in said message body obtained via said web-based graphical user interface with a recipient's name stored on said server computer.

24. The method of claim 1, further comprising the step of:
e) substituting said one or more markups indicating variable fields in said message subject and/or in said message body obtained via said web-based graphical user interface with a recipient's date of birth stored on said server computer.

25. The method of claim 1, further comprising the step of:
e) substituting said one or more markups indicating variable fields in said message subject and/or in said message body with a recipient's name provided by said remote user on said web-based graphical user interface in one or more address fields.

26. The method of claim 1, further comprising the step of:
e) providing a selector field on said web-based graphical user interface configured to insert said one or more markups indicating variable fields into said message subject and/or into said message body.

27. A system, comprising:
a) means for providing a web-based graphical user interface to a remote user operating a remote computer, wherein said web-based graphical user interface is configured to send electronic messages and said web-based graphical user interface comprises an element for selecting an option for generating and transmitting individual electronic messages to each of a plurality of recipients listed in visible fields, wherein said web-based graphical user interface is achieved by a first computer-readable code on a server computer and by a second computer-readable code on said remote computer, and wherein said server computer and said remote computer are communicatively connected via a computer network,
b) means for obtaining from said remote computer a set of data via said web-based graphical user interface, wherein said set of data comprises a list of two or more recipients in visible fields, a message subject and/or a message body comprising one or more variable fields personalized, according to a name and an email address in said visible fields, to each of said plurality of recipients in each said message body, and an indicator that said option for sending individual electronic messages to multiple recipients in visible fields was selected, and wherein said message subject and/or said message body contain one or more markups indicating variable fields,
c) means for generating individual electronic messages to each recipient in said list of two or more recipients in visible fields, wherein said one or more markups indicating variable fields are substituted with a recipient's information,
d) means for determining a spam index from said set of data obtained from said remote computer, said spam index being determined by applying at least one statistical analysis to one or more terms in said message body to determine a predetermined interval,
e) means for declining transmission of said individual electronic messages if said spam index is outside said predetermined interval, and
f) means for transmitting said individual electronic messages via said computer network if said spam index is within said predetermined interval.

28. The system of claim 27, further comprising:
e) means for saving a public key into a DNS record of a domain name,
f) means for creating a digital signature using said message subject and/or said message body and a private key corresponding to said public key saved into said DNS record, and
g) means for appending said digital signature to said individual electronic messages, wherein said individual electronic messages are transmitted from an email address associated with said domain name.

29. The system of claim 27, further comprising:
e) means for providing a second web-based graphical user interface to said remote user operating said remote computer, wherein said second web-based graphical user interface is configured to register a domain name to said remote user.

30. The system of claim 27, further comprising:
e) means for providing a second web-based graphical user interface to said remote user operating said remote computer, wherein said second web-based graphical user interface is configured to register a domain name to said remote user with private registration.

31. The system of claim 27, further comprising:
e) means for determining whether an automated script is used for sending bulk electronic messages via said web-based graphical user interface.

32. The system of claim 27, wherein the means of said system are maintained by a domain name registrar.

33. The system of claim 27, wherein said element for selecting said option for sending individual electronic messages to multiple recipients in visible fields is implemented on said web-based graphical user interface as a checkbox.

34. The system of claim 27, wherein said element for selecting said option for sending individual electronic messages to multiple recipients in visible fields is implemented on said web-based graphical user interface as a radio button.

35. The system of claim 27, wherein said element for selecting said option for sending individual electronic messages to multiple recipients in visible fields is implemented on said web-based graphical user interface as a dropdown.

36. The system of claim 27, wherein said element for selecting said option for sending individual electronic messages to multiple recipients in visible fields is implemented on said web-based graphical user interface as a list.

37. The system of claim 27, wherein said list of two or more recipients in visible fields used for generating said individual electronic messages to each recipient is obtained from a "to" field of said web-based graphical user interface.

38. The system of claim 27, wherein said list of two or more recipients in visible fields used for generating said individual electronic messages to each recipient is obtained from a "cc" field of said web-based graphical user interface.

39. The system of claim 27, further comprising:
e) means for transmitting a copy of said individual electronic messages with said one or more markups indicating variable fields substituted with said recipient's information to recipients in a "bcc" field of said web-based graphical user interface.

40. The system of claim 27, further comprising:
e) means disabling a "bcc" field of said web-based graphical user interface in response to said remote user selecting said option for sending individual electronic messages to multiple recipients in visible fields.

41. The system of claim 27, further comprising:
e) means for moving a recipient's address from a "bcc" field of said web-based graphical user interface into a "to" field or a "cc" field of said web-based graphical user interface in response to said remote user selecting said option for sending individual electronic messages to multiple recipients in visible fields.

42. The system of claim 27, wherein said web-based graphical user interface limits a number of recipients of said individual electronic messages in said list of two or more recipients in visible fields.

43. The system of claim 27, wherein said web-based graphical user interface limits a number of recipients of said individual electronic messages in said list of two or more recipients in visible fields to a maximum of 100.

44. The system of claim 27, wherein said message subject obtained from said remote computer as part of said set of data via said web-based graphical user interface contains graphics.

45. The system of claim 27, wherein said message body obtained from said remote computer as part of said set of data via said web-based graphical user interface contains graphics.

46. The system of claim 27, wherein said recipient's information used for substituting said one or more markups indicating variable fields in said message subject and/or in said message body obtained via web-based graphical user interface is a recipient's name.

47. The system of claim 27, wherein said recipient's information used for substituting said one or more markups indicating variable fields in said message subject and/or in said message body obtained via web-based graphical user interface is a recipient's email address.

48. The system of claim 27, wherein said recipient's information used for substituting said one or more markups indicating variable fields in said message subject and/or in said message body obtained via web-based graphical user interface is a recipient's date of birth.

49. The system of claim 27, further comprising:
e) means for substituting said one or more markups indicating variable fields in said message subject and/or in said message body obtained via said web-based graphical user interface with a recipient's name stored on said server computer.

50. The system of claim 27, further comprising:
e) means for substituting said one or more markups indicating variable fields in said message subject and/or in said message body obtained via said web-based graphical user interface with a recipient's date of birth stored on said server computer.

51. The system of claim 27, further comprising:
e) means for substituting said one or more markups indicating variable fields in said message subject and/or in said message body with a recipient's name provided by said remote user on said web-based graphical user interface in one or more address fields.

52. The system of claim 27, further comprising:
e) means for providing a selector field on said web-based graphical user interface configured to insert said one or more markups indicating variable fields into said message subject and/or into said message body.

* * * * *